(12) United States Patent
Ryu et al.

(10) Patent No.: US 12,633,576 B2
(45) Date of Patent: May 19, 2026

(54) BATTERY CELL, BATTERY MODULE, AND METHOD FOR MANUFACTURING BATTERY CELL

(71) Applicant: LG Energy Solution, Ltd., Seoul (KR)

(72) Inventors: Ji Hoon Ryu, Daejeon (KR); Dong Kyu Kim, Daejeon (KR); Yeo Min Yoon, Daejeon (KR); Jung Pil Lee, Daejeon (KR); Tae Seob Lim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 244 days.

(21) Appl. No.: 18/271,651

(22) PCT Filed: Sep. 28, 2022

(86) PCT No.: PCT/KR2022/014519
§ 371 (c)(1),
(2) Date: Jul. 10, 2023

(87) PCT Pub. No.: WO2023/055052
PCT Pub. Date: Apr. 6, 2023

(65) Prior Publication Data
US 2024/0055666 A1 Feb. 15, 2024

(30) Foreign Application Priority Data

Sep. 28, 2021 (KR) ........................ 10-2021-0127743
Sep. 27, 2022 (KR) ........................ 10-2022-0122860

(51) Int. Cl.
*H01M 2/02* (2006.01)
*H01M 10/0565* (2010.01)
(Continued)

(52) U.S. Cl.
CPC ... *H01M 10/0585* (2013.01); *H01M 10/0565* (2013.01); *H01M 50/105* (2021.01);
(Continued)

(58) Field of Classification Search
CPC ......... H01M 10/0585; H01M 10/0583; H01M 10/058; H01M 10/0565; H01M 10/14;
(Continued)

(56) References Cited

U.S. PATENT DOCUMENTS

2003/0003367 A1 1/2003 Roh et al.
2006/0263686 A1* 11/2006 Zhao ................... H01M 50/534
429/211
(Continued)

FOREIGN PATENT DOCUMENTS

JP 2002-237279 A 8/2002
JP 2003-223926 A 8/2003
(Continued)

*Primary Examiner* — Raymond Alejandro
(74) *Attorney, Agent, or Firm* — Bryan Cave Leighton Paisner LLP

(57) ABSTRACT

A battery cell, a battery module comprising the battery cell, and a method for manufacturing the battery cell are provided. The battery cell includes a cell case having an accommodation space; an electrode assembly comprising a plurality of electrode plates and separators alternately stacked, and accommodated in the accommodation space; an electrode tab extending outward from each of the electrode plates; a gel electrolyte disposed in the accommodation space and surrounding the electrode tab formed at one side of the electrode assembly; and a liquid electrolyte disposed in the accommodation space and surrounding the other side of the electrode assembly, at which the electrode tab is not formed.

17 Claims, 23 Drawing Sheets

(51) Int. Cl.
  *H01M 10/0585*     (2010.01)
  *H01M 50/105*      (2021.01)
  *H01M 50/531*      (2021.01)
  *H01M 50/609*      (2021.01)
(52) U.S. Cl.
  CPC ....... *H01M 50/531* (2021.01); *H01M 50/609*
    (2021.01); *H01M 2300/0025* (2013.01); *H01M*
    *2300/0085* (2013.01)
(58) Field of Classification Search
  CPC ........... H01M 10/0566; H01M 50/531; H01M
    50/105; H01M 50/609; H01M 2300/0025;
    H01M 2300/0085
  See application file for complete search history.

(56)         References Cited

U.S. PATENT DOCUMENTS

2013/0236764 A1   9/2013  Hu et al.
2014/0170470 A1   6/2014  Jeong et al.

2017/0222278 A1   8/2017   Kwon et al.
2019/0319251 A1*  10/2019  Xiao ................... H01M 50/129
2020/0365933 A1   11/2020  Shin et al.
2021/0175506 A1   6/2021   Shirpour et al.
2022/0123361 A1   4/2022   Lee et al.
2023/0036415 A1*  2/2023   Busacca ............. H01M 50/191

FOREIGN PATENT DOCUMENTS

JP       2017-537429  A   12/2017
JP       2020-057502  A    4/2020
KR       10-0558843   B1   3/2006
KR       10-1453781   B1  10/2014
KR     10-2016-0051660 A   5/2016
KR     10-2016-0110090 A   9/2016
KR     10-2018-0082752 A   7/2018
KR     10-2018-0083261 A   7/2018
KR     10-2019-0112656 A  10/2019
KR     10-2020-0099891 A   8/2020

* cited by examiner

180

181

181

BATTERY CELL, BATTERY MODULE, AND METHOD FOR MANUFACTURING BATTERY CELL

CROSS-REFERENCE TO RELATED APPLICATION

This application is a National Stage Application of International Application No. PCT/KR2022/014519 filed on Sep. 28, 2022, which claims the benefit of the priority of Korean Patent Application No. 10-2021-0127743 filed on Sep. 28, 2021, and Korean Patent Application No. 10-2022-0122860 filed on Sep. 27, 2022, the disclosures of which are incorporated herein by reference in their entirety.

FIELD

The present disclosure relates to a battery cell, a battery module, and a method for manufacturing the battery cell, and more particularly, to a battery cell having improved durability without deterioration of battery performance, a battery module, and a method for manufacturing the battery cell.

BACKGROUND

Current commercially available secondary batteries include nickel cadmium batteries, nickel hydride batteries, nickel zinc batteries, lithium secondary batteries, and the like. Lithium secondary batteries do not have a memory effect compared to nickel-based secondary batteries and thus be freely charged and discharged. In addition, lithium secondary batteries get into the spotlight due to their very low self-discharge rate and high energy density.

Lithium secondary batteries mainly use lithium-based oxides and carbon materials as positive electrode active materials and negative electrode active materials, respectively. A lithium secondary battery includes an electrode assembly in which positive and negative electrode plates, which are coated with a positive electrode active material and a negative electrode active material on collectors, respectively, and a separator interposed between the positive and negative electrode plates are sequentially stacked, an electrolyte, and an exterior, in which the electrode assembly and the electrolyte are accommodated together to be sealed.

In addition, the lithium secondary battery may be classified into a can-type secondary battery and a pouch-type secondary battery according to the type of the exterior. In the can-type secondary battery, an electrode assembly is embedded in a metal can. In the pouch-type secondary battery, an electrode assembly is embedded in a pouch made of a soft polymer material having an irregular shape, for example, an aluminum laminate sheet pouch.

As the lithium secondary batteries have recently been widely used in small-sized devices such as portable electronic devices as well as medium-large devices such as automobiles and power storage devices, research to increase in capacity and output of the lithium secondary batteries has emerged. The pouch-type secondary battery cell is used in such the medium- or large-sized devices, as a large number of battery cells can be easily stacked.

An electrode tab is formed on at least one side of a metal foil used for a positive electrode collector and a negative electrode collector. The electrode tab has a bent shape during a welding process between electrode leads.

The electrode tab is relatively weak in mechanical strength due to their very thin thickness, and when finely folded and unfolded operations of the electrode tab are repeated, disconnection of the electrode tab may easily occur due to an external impact. The disconnection of the electrode tab allows capacitance of the connected electrode to be non-revealed, resulting in deterioration in charge/discharge performance of the secondary battery cell during the use. Particularly, in the case of the pouch-type secondary battery cell provided in a vehicle pack, since the secondary battery cell is exposed to frequent vibrations and impacts, there is a problem in that the lifespan of the battery cell is rapidly shortened. In addition, as a collector is thinner to increase in energy density of the battery cell, mechanical rigidity of the electrode tab is also deteriorated, resulting in frequent disconnection at a bent portion of the electrode tab or a connected portion between the electrode tab and the electrode. Furthermore, since a width of the electrode tab is narrow, and a length of the tab is shortened as the battery cell is miniaturized, when the battery cell is subjected to an external impact, the disconnection of the electrode tab is more likely to occur.

Therefore, there is a demand for developing a structure for a new pouch-type secondary battery cell capable of preventing the disconnection of an electrode tab upon the external impact.

SUMMARY

The present disclosure is to provide a battery cell improved durability without deterioration of battery performance, a battery module comprising the battery cell, and a method for manufacturing the battery cell.

According to an aspect of the present disclosure, a battery cell may include: a cell case having an accommodation space; an electrode assembly comprising a plurality of electrode plates and separators alternately stacked, and accommodated in the accommodation space; an electrode tab extending outward from each of the electrode plates configured to electrically connect the each of the electrode plates to an external terminal; a gel electrolyte disposed in the accommodation space and surrounding the electrode tab formed at one side of the electrode assembly to prevent the electrode tab from moving; and a liquid electrolyte disposed in the accommodation space and surrounding the other side of the electrode assembly, at which the electrode tab is not formed.

In an embodiment, the gel electrolyte may be disposed in a space, which is a peripheral region of the electrode tab, in the accommodation space, and the liquid electrolyte may be disposed in the remaining space, in which the gel electrolyte is not disposed, in the accommodation space.

According to another aspect of the present disclosure, a battery module may include at least one battery cell described above.

According to further another aspect of the present disclosure, a method for manufacturing the battery cell of claim 1 includes: preparing an electrode assembly provided with a plurality of electrode plates, which are provided with an electrode tab formed at one side thereof, and separators disposed between the electrode plates; disposing the electrode assembly in an accommodation space of a pouch; injecting a curable electrolyte composition through an injection space of the pouch such that the curable electrolyte composition surrounds the electrode tab in the accommodation space of the pouch; converting the curable electrolyte composition into a gel electrolyte having a gel phase to prevent the electrode tab from moving; and injecting a liquid electrolyte into the accommodation space such that the liquid electrolyte surrounds the other side of the electrode assembly, at which the electrode tab is not formed.

In further another embodiment, a curable compound may be contained in a content of 3 wt % to 30 wt % in the curable electrolyte composition.

In further another embodiment, the method may further include forming a blocking part configured to block movement of the curable electrolyte composition from the accommodation space to the injection space, before the injecting the curable electrolyte composition.

In further another embodiment, the forming of the blocking part may include forming the blocking part such that the blocking part extends along a boundary between the accommodation space and the injection space from an outer circumferential portion of the pouch and protrude to the inside of the electrode assembly further than one end of the electrode assembly.

In further another embodiment, the forming of the blocking part may include melting and bonding a portion between the injection space and the accommodation space of the pouch or pressing the portion between the accommodation space and the injection space of the pouch.

In further another embodiment, the method may further include, before the converting the curable electrolyte composition into the gel electrolyte having the gel phase, pressing and fixing the pouch and the electrode assembly by using a jig plate outside the pouch to fix a shape of the curable electrolyte composition.

The converting the curable electrolyte composition into the gel electrolyte having the gel phase may be performed in a state in which the pouch and the electrode assembly are pressed and fixed.

In further another embodiment, the injecting the curable electrolyte composition may include disposing the pouch and the electrode assembly such that the electrode tab is disposed in a lower portion of the electrode assembly, and disposing the curable electrolyte composition by gravity such that the curable electrolyte composition surrounds the electrode tab.

In further another embodiment, the method may further include rotating the pouch such that the electrode tab is disposed at a side portion of the electrode assembly, before the injecting the liquid electrolyte.

In the battery cell of the present disclosure, the gel electrolyte may be disposed in the region, in which the electrode tab is formed, and the liquid electrolyte may be disposed in the electrode assembly region, in which the electrode tab is not formed. When the external impact is applied to the battery cell, the movement of the electrode tab may be prevented to reduce the deformation of the electrode tab. Therefore, when the battery cell of the present disclosure is mounted and applied to the vehicle, even if the frequent impact and vibration generated during the movement are transmitted to the battery cell, the movement and deformation of the electrode tab may be minimized by the gel electrolyte that is in the semi-solid state.

Furthermore, the battery cell of the present disclosure may prevent the electric charging and discharging of the electrode from being deactivated by the disconnection of the electrode tab due to the frequent movement of the electrode tab. In addition, the battery cell of the present disclosure may minimize the damage to the electrode tab even when the external impact is applied by accommodating the gel polymer electrolyte and also may use the liquid electrolyte together to reduce the internal resistance of the battery, thereby effectively improving the cycle characteristics.

In addition, according to another embodiment of the present disclosure, the manufacturing method of the present disclosure may further include the forming of the blocking part inside the pouch before the injecting the curable electrolyte composition to prevent the curable electrolyte composition from moving from the accommodation space into the injection space before being cured. As described above, in the manufacturing method of the present disclosure, it is easy to maintain the state in which the curable electrolyte composition is disposed to surround the electrode tab until the curing electrolyte composition is cured by the blocking part, thereby significantly improving the manufacturing processability.

DETAILED DESCRIPTION

Figure 1:
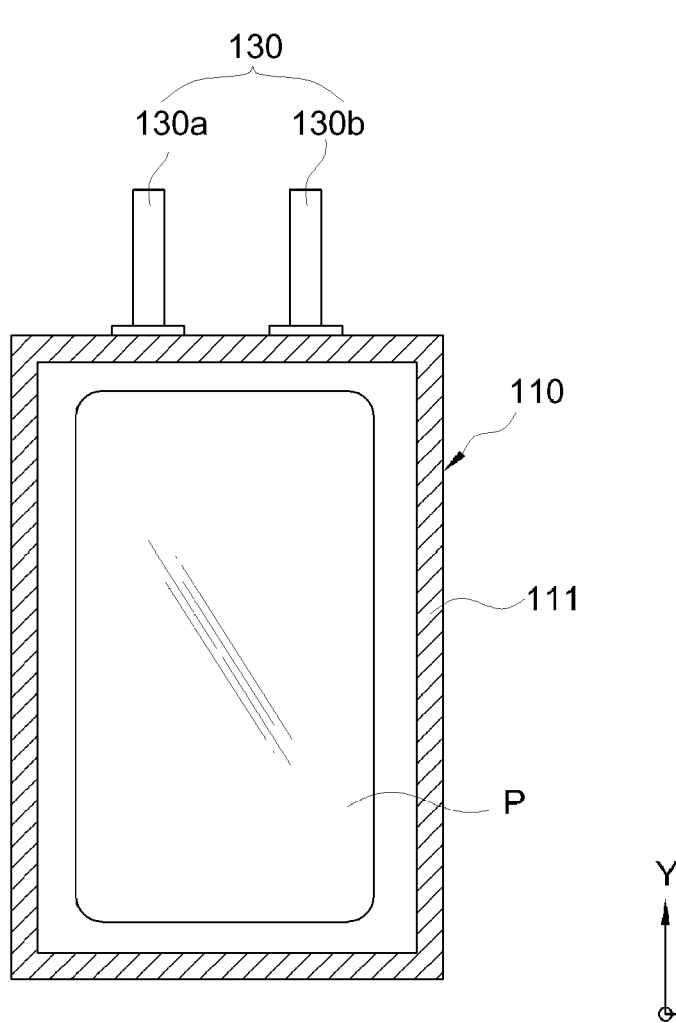
FIG. 1 is a plan view illustrating a battery cell according to an embodiment of the prevent disclosure.

Hereinafter, the present disclosure will be described in detail with reference to the drawings. Moreover, detailed descriptions related to well-known functions or configurations will be ruled out in order not to unnecessarily obscure subject matters of the present disclosure. In addition, the following embodiments may be modified in many different forms, and the scope of the technical spirit of the present disclosure is not limited to the following embodiments. Rather, these embodiments are provided so that the present disclosure will be thorough and complete, and will fully convey the scope of the present disclosure to those skilled in the art.

It should be understood that the techniques described herein are not intended to be limited to specific embodiments, but include various modifications, equivalents, and/or alternatives of the embodiments of the present disclosure.

In the description with reference to the drawings, like reference numerals may be used for referring to the same or similar components.

In the present disclosure, expressions such as "has", "may have", "includes" or "may include" indicate the existence of a corresponding feature (e.g., numerical value, function, operation, or element such as a component) and do not exclude the presence of additional features.

In the present disclosure, expressions such as "A or B", "at least one of A and/or B", or one or more of "A and/or B" may include all possible combinations of items listed together. For example, "A or B," "at least one of A and B," or "at least one of A or B" may refer to all cases including (1) at least one A, (2) at least one B, or (3) at least one A and at least one B.

Figure 2:
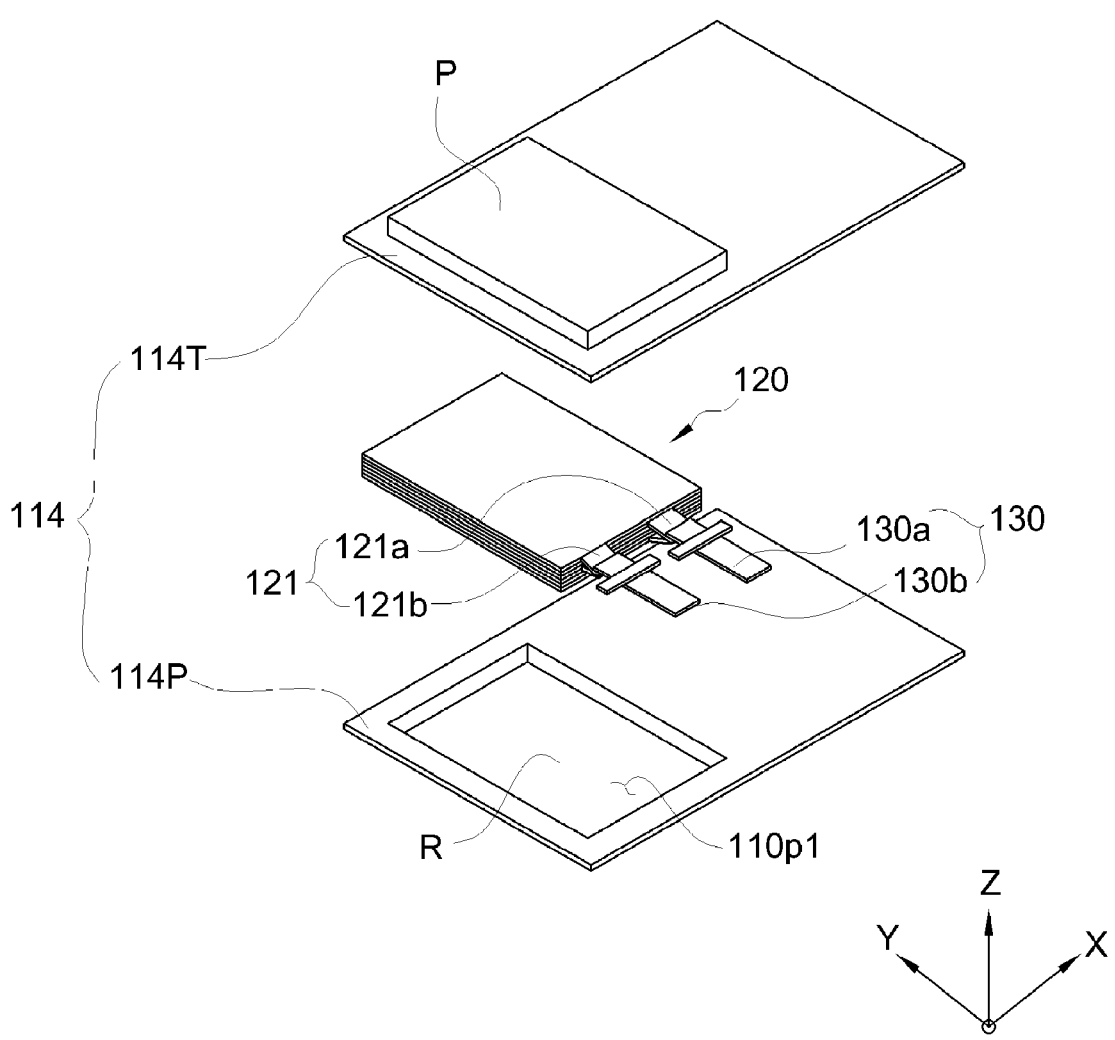
FIG. 2 is an exploded perspective view illustrating a pouch and an electrode assembly of the pouch according to an embodiment of the present disclosure.
Figure 3:
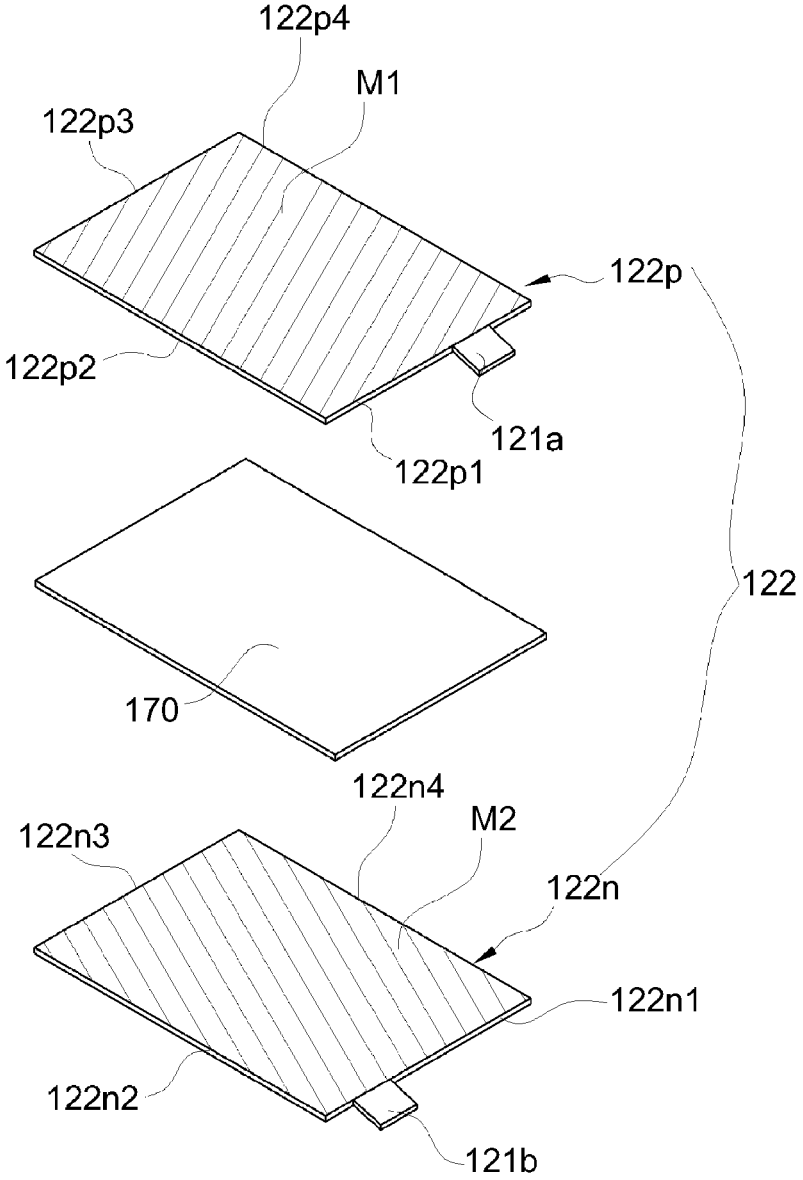
FIG. 3 is an exploded perspective view illustrating a plurality of electrode plates and a separator according to an embodiment of the present disclosure.
Figure 4:
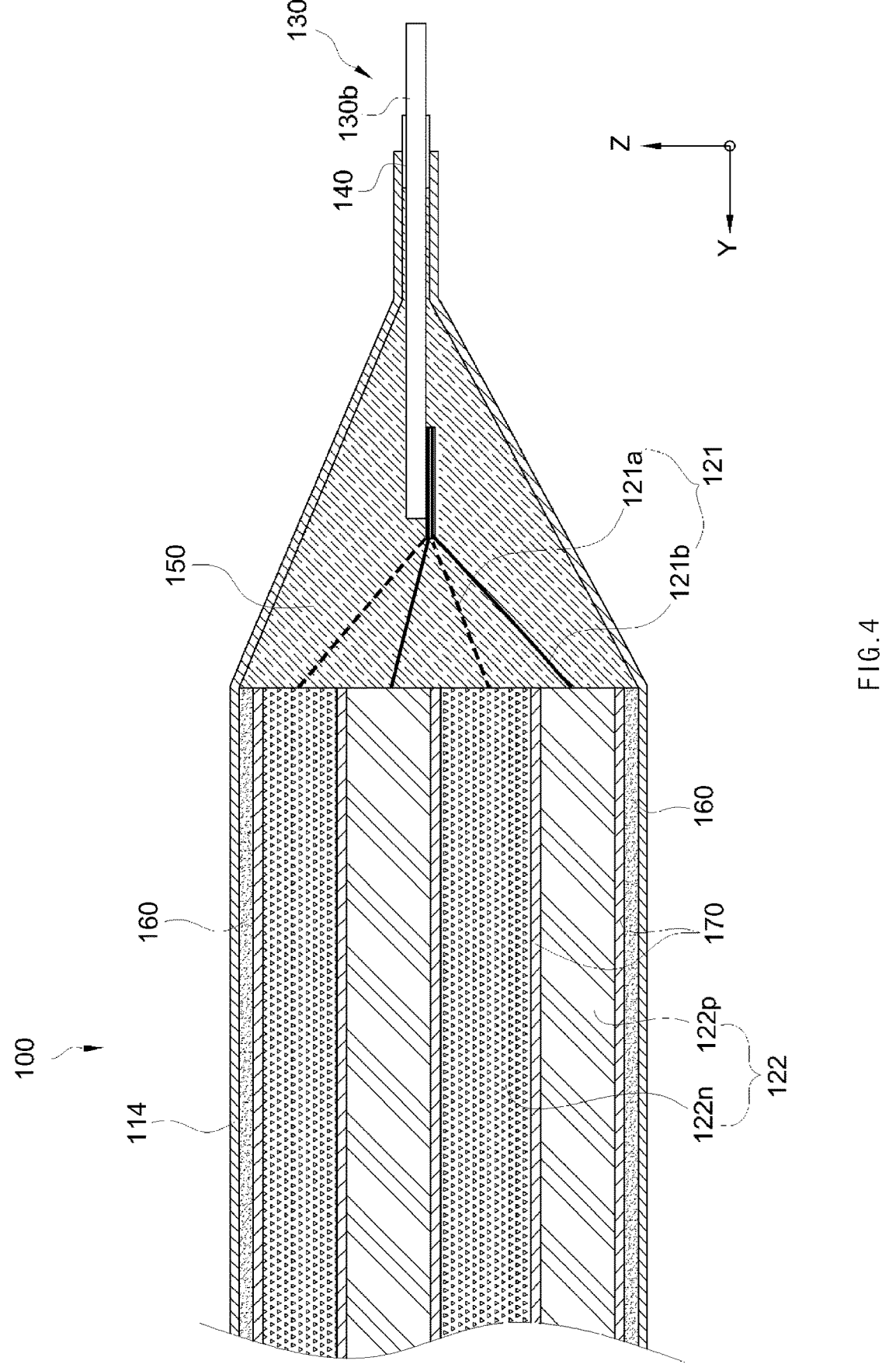
FIG. 4 is a vertical cross-sectional view illustrating an internal configuration of the battery cell according to an embodiment of the present disclosure.
Figure 5:
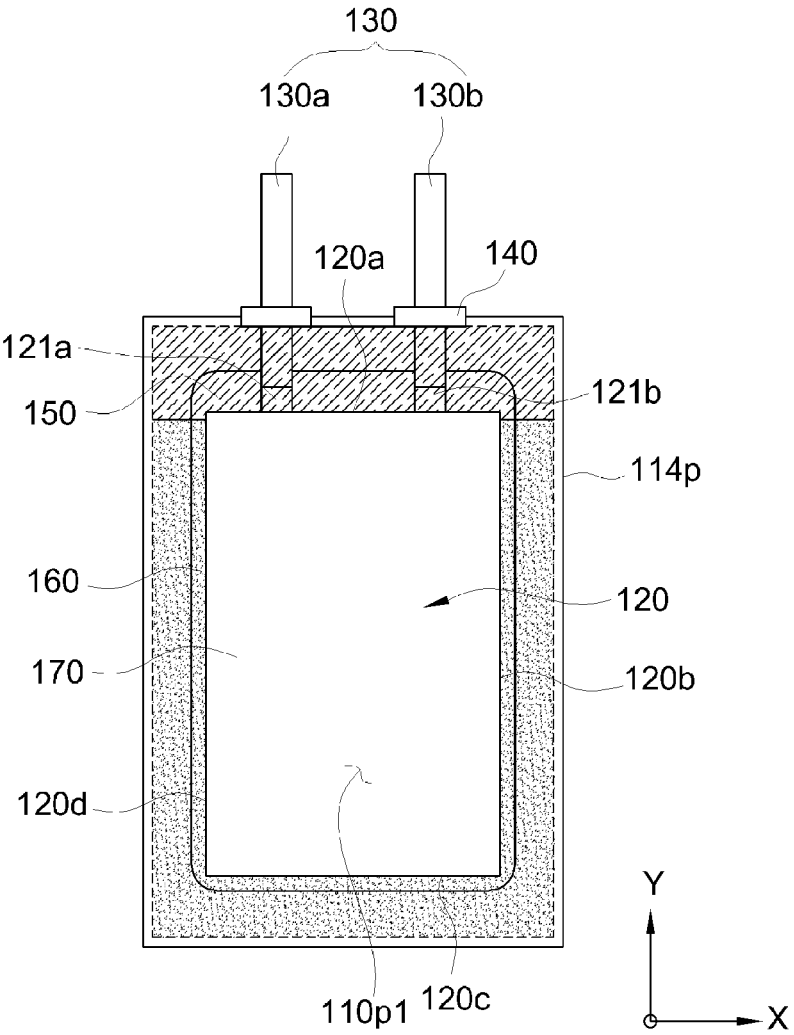
FIG. 5 is a plan view illustrating the internal configuration of the battery cell according to an embodiment of the present disclosure.

FIG. 1 is a plan view illustrating a battery cell 100 according to an embodiment of the prevent disclosure. FIG. 2 is an exploded perspective view illustrating a pouch 114 and an electrode assembly 120 of the battery cell 100 according to an embodiment of the present disclosure. FIG. 3 is an exploded perspective view illustrating a separator 170 and electrodes 122 according to an embodiment of the present disclosure. FIG. 4 is a vertical cross-sectional view illustrating an internal configuration of the battery cell 100 according to an embodiment of the present disclosure. Also, FIG. 5 is a plan view illustrating the internal configuration of the battery cell 100 according to an embodiment of the present disclosure. For reference, a gel electrolyte 150 and a liquid electrolyte 160 are omitted in FIG. 2 for convenience of description. In addition, for convenience of explanation, FIG. 5 illustrates a state in which a first cell sheet 114T is removed from the battery cell 100 of FIG. 1.

First, referring to FIG. 1, the battery cell 100 according to an embodiment of the present disclosure may include a cell case 110, in which an electrode assembly (not shown) and an electrolyte are accommodated, and an electrode lead 130 including a positive electrode lead 130a connected to a positive electrode tab (not shown) and a negative electrode lead 130b connected to a negative electrode tab (not shown). In addition, the cell case 110 may have a sealing part 111 thermally fused to form an outer circumferential portion thereof.

Particularly, referring to FIGS. 1 to 5, the cell case 110 may include an accommodation space 110p1 in which an electrode assembly 120, an electrode tab 121, a gel electrolyte 150, and a liquid electrolyte 160 are accommodated. The accommodation space 110p1 may be a portion deformed into a cup shape by pressing a portion of at least one of two cell sheets 114T and 114P by using a high-temperature hot press. The accommodation space 110p1 may be a portion P in which a portion of each of the cell sheets 114T and 114P convexly protrudes outward.

The accommodation space 110p1 of the cell case 110 may have a size greater than a size that is enough to accommodate the plurality of electrode plates 122, the separator 170, the gel electrolyte 150, and the liquid electrolyte 160. For example, as illustrated in FIG. 2, the accommodation space 110p1 of the cell case 110 may be formed by coupling a portion, which convexly protrudes in an upward direction of the first cell sheet 114T, to a portion, which convexly protrudes in a downward direction of the second cell sheet 114P.

The cell case 110 may be a pouch-type case made of a soft material. The cell case 110 may include the first cell sheet 114T covering an upper portion of the electrode assembly 120, and the second cell sheet 114P coupled to a portion of a bottom surface of the first cell sheet 114T and covering a lower portion of the electrode assembly 120. Each of the first cell sheet 114T and the second cell sheet 114P may be a laminate sheet. Particularly, the laminate sheet may have a structure in which a thin metal film (e.g., Al film) is laminated between a water-resistant polymer film (nylon) and a thermal bonding polymer film (e.g., cast polypropylene). Since the structure of the laminate sheet and a material forming each layer are widely known in the art to which the present disclosure pertains, a detailed description thereof will be omitted.

To seal the cell case 110, portions of the first cell sheet 114T and the second cell sheet 114P may be thermally fused to each other. The thermal fusion method includes pressing at least a portion of outer circumferential portions, which face each other in a state, in which the first cell sheets 114T and the second cell sheet 114P are stacked, by using a high-temperature tool (e.g., hot press). Here, the thermal fusing temperature may be 110 degrees to 150 degrees. For example, as illustrated in FIG. 1, the cell case 110 may include a thermally fused sealing part 111 on the outer circumferential portion.

In addition, as illustrated in FIG. 3, the electrode plates 122 may be at least one positive electrode 122p and at least one negative electrode 122n according to electrical polarities. The electrode plate 122 may include a collector (not shown), an electrode active material applied on the collector, a conductive material, and a mixture M1 of a binder. The collector may be an aluminum alloy foil or a copper alloy foil. For example, the positive electrode 122p may be formed by applying a mixture of a positive electrode active material, the conductive material, and the binder to a collector made of an aluminum alloy material. The negative electrode 122n may be formed by applying a mixture M2 of a negative electrode active material, the conductive material, and the binder to a collector made of a copper alloy material. In addition, a separator 170 may be disposed between the positive electrode 122p and the negative electrode 122n. The separator 170 may serve to block an internal short circuit between the positive electrode 122p and the negative electrode 122n and perform immersion in the electrolyte. The separator 170 of the present disclosure may be used without particular limitation as long as the separator 170 is a separator material commonly used in the secondary battery. For example, the separator 170 may be made of at least one of polyethylene or polypropylene. In addition, the positive electrode 122p, the separator 170, and the negative electrode 122n may be sequentially stacked to form the electrode assembly 120.

A mixture of the electrode active material, the conductive material, and the binder may not be applied to the electrode tab 121 illustrated in FIG. 2. The electrode tab 121 may be a path through which electrons move. The electrode tab 121 may be formed by cutting a non-coating portion that is not coated with the positive electrode active material, or may be formed separately by connecting a separate conductive member to the non-coating portion of the electrode plate 122 by ultrasonic welding or the like. For example, as illustrated in FIG. 3, the electrode tab 121 protruding from a first side 122n1 may be provided on each of the positive electrode 122p and the negative electrode 122n. However, it is not necessarily limited to this form. For example, the electrode tab 121 may be formed on one or more of a first side, a second side, a third side, and a fourth side of the electrode 122 in each of front, rear, left and right directions. For example, as illustrated in FIG. 3, when the positive electrode 122p has a rectangular shape on a plane, the positive electrode tab 121a may be formed on one or more of a first side 122p1, a second side 122p2, a third side 122p3, and a fourth side 122p4. In addition, when the negative electrode 122n has a rectangular shape on the plane, the negative electrode tab 121b may be formed on one or more of a first side 122n1, a second side 122n2, a third side 122n3, and a fourth side 122n4.

As illustrated in FIG. 2, the battery cell 100 according to an embodiment of the present disclosure may further include an electrode lead 130 coupled to a portion of the electrode tab 121. The electrode lead 130 may be an electrically conductive metal. As illustrated in FIG. 2, the electrode lead 130 may include a positive electrode lead 130a connected to the positive electrode tab 121a and a negative electrode lead 130b connected to the negative electrode tab 121b. The electrode lead 130 may be connected to one or more electrode tabs 121 by various methods such as welding. A portion of the electrode lead 130 may be disposed to be exposed to the outside of the cell case 110. That is, the electrode lead 130 serves as an electrode terminal of the battery cell 100. For example, the positive electrode lead 130a may serve as a positive terminal of the battery cell 100, and the negative electrode lead 130b may serve as a negative terminal of the battery cell 100. In addition, as illustrated in FIG. 4, the battery cell 100 may include an insulating film 140 configured to surround a portion of an outer surface of the electrode lead 130. The insulating film 140 may electrically insulate the cell case 110 from the electrode lead 130 and may be configured to be thermally fused to the cell case 110.

The gel electrolyte 150 illustrated in FIGS. 4 and 5 means an electrolyte having a gel phase. The gel electrolyte 150 may include a polymer cured to such an extent that the electrolyte exhibits the gel phase. That is, here, the gel phase may be referred to as a semi-solid and means that maintains a constant shape without flowing in a steady state due to high viscosity.

In addition, the gel phase may be phenomenologically defined as a soft solid-like material containing one or more liquids. For example, the gel electrolyte 150 may include mostly liquid materials and some solid materials in terms of a weight ratio. Particularly, the gel electrolyte 150 may be prepared by curing a curable compound mixed in the liquid electrolyte 160 and changing the liquid phase to a gel-state electrolyte. The curable compound may include a thermosetting compound A or an ultraviolet curable compound B.

Particularly, as illustrated in FIGS. 4 and 5, the gel electrolyte 150 is disposed in an accommodation space 110p1 of the cell case 110 to surround the electrode tab 121. That is, the gel electrolyte 150 may be disposed at one side of the electrode assembly 120 at which the electrode tab 121 is disposed in the accommodation space 110p1. The gel electrolyte 150 may be provided in a shape surrounding the outer surface of the electrode tab to prevent movement of the electrode tab 121 upon an external impact. For example, as illustrated in FIG. 4, the gel electrolyte 150 may be disposed between an inner surface of the accommodation space 110p1 and a first side 120a of the electrode assembly 120, at which the electrode tab 121 is disposed. Here, the gel electrolyte 150 may surround outer surfaces of each of the positive electrode tab 121a and the negative electrode tab 121b to prevent movement of each of the positive electrode tab 121a and the negative electrode tab 121b. However, it is not necessarily limited to this form. For example, when the electrode tab 121 is disposed at one or more of a first side 120b, a second side 120b, a third side 120c, and a fourth side 120d of the electrode assembly 120, the gel electrolyte 150 may be disposed at one of more of the first side 120b, the second side 120b, the third side 120c, and the fourth side 120d of the electrode assembly 120, at which the electrode tab 121 is disposed. In addition, the gel electrolyte 150 may be configured to surround the outer surface of the electrode tab 121. Particularly, the gel electrolyte 150 may be configured to surround a bonded portion between the electrode tab 121 and the electrode lead 130.

In addition, the gel electrolyte 150 may be partially disposed on the other side of the electrode assembly 120, at which the electrode tab 121 is not disposed. For example, the gel electrolyte 150 may be partially disposed at each of the second side 120b and the fourth side 120d of the electrode assembly 120, at which the electrode tab 121 is not disposed.

Therefore, according to this configuration of the present disclosure, when compared to the case, in which the liquid electrolyte 160 of the battery cell according to the related art surround the electrode tab, in the battery cell 100, when an external impact is applied to the battery cell 100, since the gel electrolyte 150 surrounds the electrode tab 121, the gel electrolyte 150 may prevent the electrode tab 121 from moving to reduce deformation. Thus, in the case of the battery cell 100 mounted in a vehicle, even if frequent impacts and vibrations generated during traveling are transmitted to the battery cell 100, the movement and deformation of the electrode tab 121 may be minimized by the gel electrolyte 150 that is in a semi-solid state.

Furthermore, the present disclosure may prevent disconnection of a connection portion between the electrode tab 121 and the electrode 122 or a bent portion of the electrode tab 121 due to the frequent movement of the electrode tab 121 and thus may prevent electrical charging and discharging of the electrode 122 from being inactivated due to the disconnection. Furthermore, in the battery cell 100 of the present disclosure, even though the external impact is applied, damage of the electrode tab 121 may be minimized to effectively extend lifespan of the battery cell 100.

Also, the liquid electrolyte 160 illustrated in FIGS. 4 and 5 means an electrolyte that is in a liquid state. The battery cell 100 according to an embodiment of the present disclosure may perform the charging and discharging through ion-exchange between the positive electrode 122p and the negative electrode 122n through the liquid electrolyte 160. The liquid electrolyte 160 may be disposed between the positive electrode 122p and the negative electrode 122n to allow ions to move between the positive electrode 122p and the negative electrode 122n. In addition, the liquid electrolyte 160 may be disposed on the surface and pores of the separator 170. When the battery cell 100 is a lithium secondary battery, a conventional non-aqueous electrolyte may be used as the liquid electrolyte.

In addition, the liquid electrolyte 160 may be accommodated in the accommodation space 110p1 to surround at the other side of at least one of the electrode assembly 120, at which the electrode tab 121 is not disposed. When the electrode tab 121 is disposed at the first side 120a of the electrode assembly 120, the liquid electrolyte 160 may be disposed at one or more of the remaining second side 120b, third side 120c, and fourth side 120d. For example, as illustrated in FIG. 5, when the electrode tab 121 is disposed at the first side 120a of the electrode assembly 120, the liquid electrolyte 160 may be disposed to surround the remaining second side 120b, third side 120c, and fourth side 120d.

According to this configuration of the present disclosure, when the liquid electrolyte 160 disposed between the electrodes 122 is consumed during the charging and discharging of the battery cell 100, the liquid electrolyte 160 disposed at the other side of at least one of the electrodes 122, on which the electrode tab 121 is not formed, may move between the electrodes 122 to supplement the liquid electrolyte 160. Therefore, even if the liquid electrolyte 160 between the electrodes 122 is consumed after a plurality of charging/ discharging cycles of the battery cell 100, a decrease in lifespan of the battery cell 100 may be minimized.

In the battery cell 100 of the present disclosure, the gel electrolyte 150 may be filled only at the first side 120a of the electrode assembly 120, at which the electrode tab 121 is disposed, and the liquid electrolyte 160 may be disposed as many other sides as possible among the remaining second side 120b, third side 120c, and fourth side 120d of the electrode assembly 120, at which the electrode tab 121 is not formed. Therefore, when compared to the case in which the gel electrode 150 surrounds the entire periphery of the electrode assembly 120, the cycle characteristics of the battery cell 100 may be effectively prevented from being deteriorated.

Figure 6:
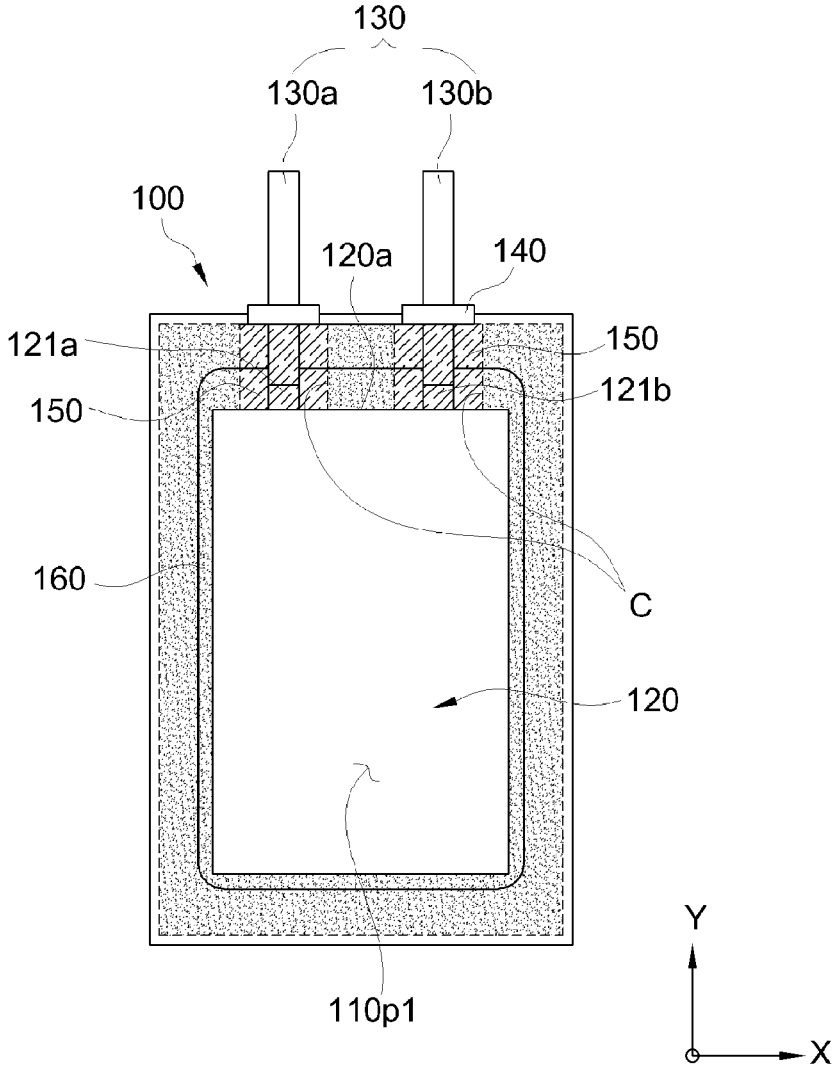
FIG. 6 is a plan view illustrating an internal configuration of a battery cell according to another embodiment of the present disclosure.

FIG. 6 is a plan view illustrating an internal configuration of a battery cell 100 according to another embodiment of the present disclosure.

Referring to FIG. 6, in the battery cell 100 according to another embodiment of the present disclosure, when compared to the battery cell 100 of FIG. 5, a gel electrolyte 150 may be disposed in a space, which is a peripheral region C of an electrode tab 121, to surround the electrode tab 121, and a liquid electrolyte 160 may be filled in the remaining space of an accommodation space 110p1, which is not filled with the gel electrolyte 150.

In FIG. 6, other components of the battery cell 100 except for the gel electrolyte 150 may be configured identically to those of FIG. 5.

Specifically, when compared to the battery cell 100 of FIG. 5, in the battery cell 100 of FIG. 6, the liquid electrolyte 160 may be filled in the remaining space except for the peripheral region C adjacent to the electrode tab 121 in the accommodation space 110p1 defined at one side of the electrode assembly 120, in which the electrode tab 121 is disposed. For example, the gel electrolyte 150 may be formed by curing a curable electrolyte composition and removing a small frame after injecting the curable electrolyte composition into the small frame having an empty interior and surrounding the peripheral region C of the electrode tab 121.

Therefore, in the battery cell 100 according to another embodiment of the present disclosure, the gel electrolyte 150 may be formed only on the peripheral region C of the electrode tab 121, and the liquid electrolyte 160 may be filled into a remaining accommodation space 110p1 so that an amount of liquid electrolyte 160 accommodated in the accommodation space 110p1 of the cell case 110 more increases. Thus, in the battery cell 100 of the present disclosure, even if the liquid electrolyte 160 is consumed in the electrode assembly 120 during the charging and discharging, there is a sufficient amount of liquid electrolyte 160 in the accommodation space 110p1, and thus, a decrease in lifespan of the battery cell 100 may be minimized.

Figure 7:
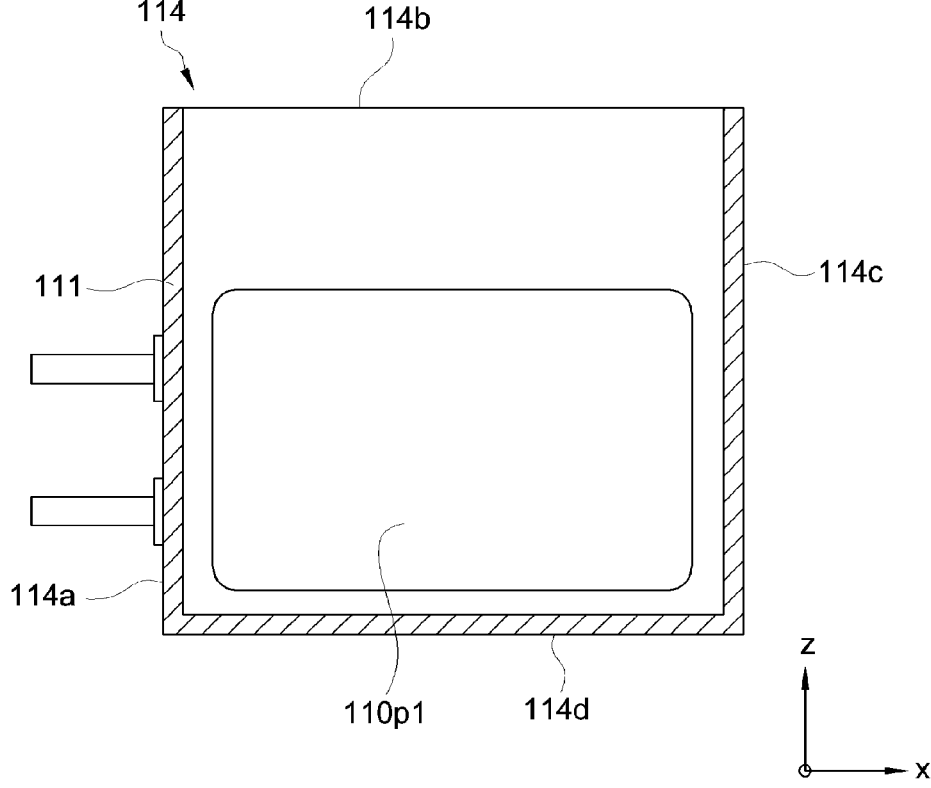
FIG. 7 is a front view illustrating a state after an electrode assembly is disposed in an accommodation space of a pouch in a method for manufacturing the battery cell according to another embodiment of the present disclosure.
Figure 8:
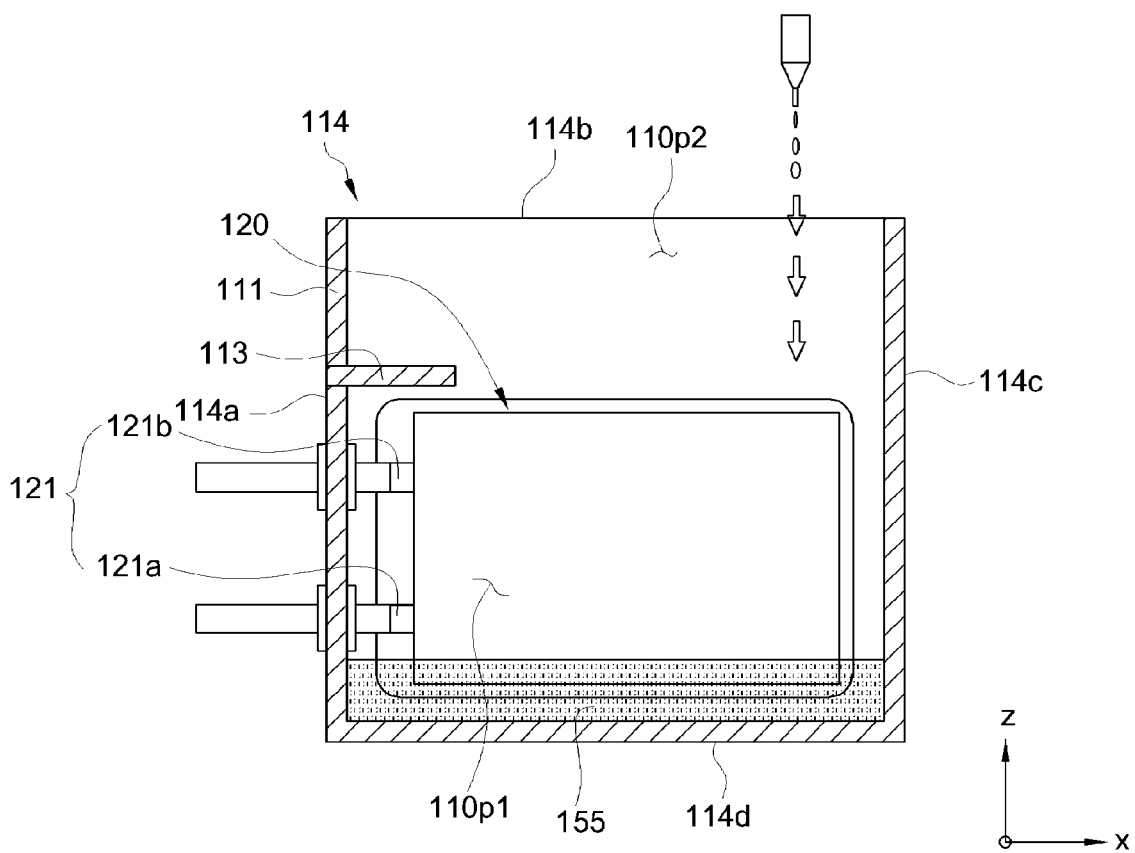
FIG. 8 is a front view illustrating an internal configuration of the pouch, in which a curable electrolyte composition is injected into the accommodation space, in the method for manufacturing the battery cell according to another embodiment of the present disclosure.

FIG. 7 is a front view illustrating a state after an electrode assembly is accommodated into an accommodation space of a pouch 114 in a method for manufacturing the battery cell 100 according to another embodiment of the present disclosure. FIG. 8 is a front view illustrating an internal configuration of the pouch 114, in which a curable electrolyte composition 155 is injected into the accommodation space 110p1, in the method for manufacturing the battery cell 100 according to another embodiment of the present disclosure. For reference, in FIG. 8, for description of the drawings, the pouch 114 is illustrated transparently so that the inside of the pouch 114 is seen from the outside.

Referring to FIGS. 7 and 8 together with FIGS. 4 and 5, the present disclosure may provide a method for manufacturing the battery cell 100. The method for manufacturing the battery cell 100 according to an embodiment of the present disclosure includes inserting an electrode assembly 120, injecting a curable electrolyte composition 155, curing the curable electrolyte composition 155, and injecting a liquid electrolyte 160. In one embodiment, the curable electrolyte composition 155 may be injected in a liquid state and then cured to be phase-changed into the gel electrolyte 150.

In one embodiment, the inserting of the electrode assembly 120 includes inserting the electrode assembly 120, which includes electrodes 122 including an electrode tab 121 formed at at least one side, and a separator 170 interposed between the electrodes 122, into the accommodation space 110$p$1 of the pouch 114. Here, the pouch 114 may be referred to as a configuration before manufacturing the cell case 110 in which the accommodation space 110$p$1 is completely sealed. The pouch 114 may be formed by bonding outer circumferential portions of a first cell sheet 114T and a second cell sheet 114P to each other. The accommodation space 110$p$1 in which the electrode tab 121, the electrode assembly 120, the curable electrolyte composition 155, and the liquid electrolyte 160 are capable of being accommodated may be formed in the pouch 114.

For example, the electrode tab 121 may be disposed at a first side 120$a$ of the electrode assembly 120. However, it is not necessarily limited to this form, and according to the manufacturing method according to another embodiment of FIGS. 19 to 21 described later, in the battery cell of the present disclosure, the electrode tab 121 may be disposed at each of the first side 120$a$ and a third side 120$c$ of the electrode assembly 120. In this case, the gel electrolyte 150 may be disposed at each of the first side 120$a$ and the third side 120$c$ of the electrode assembly 120 in the accommodation space 110$p$1 of the pouch 114. In this case, the liquid electrolyte 160 may be disposed between the electrode 122 and the separator 170, between the electrodes 122, and at the second side 120$b$ and the fourth side 120$d$ of the electrode assembly 120 in the accommodation space 110$p$1.

Referring again to FIGS. 2, 5, and 7, after the inserting of the electrode assembly 120, the outer circumferential portions of the first cell sheet 114T and the second cell sheet 114P may be thermally fused to each other in a state in which the first cell sheet 114T and the second cell sheet 114P are stacked to form the pouch 114. For example, as illustrated in FIG. 7, a sealing part 111 may be formed on an outer circumferential portion of the pouch 114. The sealing part 111 may be formed by thermally fusing a first outer circumferential portion 114$a$, a third outer circumferential portion 114$c$, and a fourth outer circumferential portion 114$d$ of each of the first cell sheet 114T and the second cell sheet 114P to each other.

In one embodiment, as illustrated in FIG. 7, at least one outer circumferential portion (edge) of the first cell sheet 114T and the second cell sheet 114P, for example, the second outer circumferential portions 114$b$ may not be fused to each other. Thus, the second outer circumferential portions 114$b$ of the first and second cell sheets 114T and 114P of the pouch 114 may be spaced apart from each other. As described above, the pouch 114 may be configured so that the curable electrolyte composition 155 or the liquid electrolyte 160 are introduced into the accommodation space 110$p$1 through a gap between the first outer circumferential portions 114$a$ of the first and second cell sheets 114T and 114P, which are not thermally fused to each other.

Referring to FIG. 8 together with FIG. 3, the injecting the curable electrolyte composition 155 may include injecting the curable electrolyte composition 155 containing a curable compound into a space in which the electrode tab 121 is disposed in the accommodation space 110$p$1. Here, the curable electrolyte composition may include a mixture in which a curable compound is mixed in the liquid electrolyte. In addition, the curable compound may include a thermosetting compound A or an ultraviolet curable compound B. The curable electrolyte composition 155 may be a liquid electrolyte before curing and may be configured so that the liquid electrolyte is phase changed into a gel-phase electrolyte by curing the curable compound in a later process.

In addition, after injecting the curable electrolyte composition 155, the curable electrolyte composition 155 may be disposed in the accommodation space 110$p$1 to surround an outer surface of the electrode tab 121 or to fill a gap between the electrode tabs 121.

The liquid electrolyte, which is a main component forming the curable electrolyte composition, may be a material in which at least one lithium salt is dissolved in a non-aqueous organic solvent, and a conventional non-aqueous electrolyte solution used when manufacturing a lithium secondary battery may be used.

Particularly, the lithium salt may include a single material or a mixture of two or more selected from the group consisting of $LiPF_6$, $LiCl$, $LiBr$, $LiI$, $LiBF_4$, $LiClO_4$, $LiB_{10}Cl_{10}$, $LiAlCl_4$, $LiAlO_4$, $LiCF_3SO_3$, $LiCH_3CO_2$, $LiCF_3CO_2$, $LiAsF_6$, $LiSbF_6$, $LiCH_3SO_3$, lithium bis(trifluoromethanesulfonyl)imide ($LiN(SO_2CF_3)_2$; LiTFSI), Lithium bis(fluorosulfonyl)imide ($LiN(SO_2F)_2$; LiFSI), and lithium bisperfluoroethanesulfonimide ($LiN(SO_2CF_2CF_3)_2$; LiBETI), particularly, may include at least one selected from the group consisting of $LiPF_6$, $LiBF_4$, $LiN(SO_2CF_3)_2$, and $LiN(SO_2F)_2$. The lithium salt may be appropriately contained within a generally usable range, but in order to obtain an optimum effect of forming a film for preventing corrosion on an electrode surface, the lithium salt may be contained in a concentration of 0.8 M to 3.0 M, particularly, 1.0 M to 3.0 M in the liquid electrolyte.

Representative examples of the non-aqueous organic solvent may be one or more selected from the group consisting of propylene carbonate (PC), ethylene carbonate (EC), diethyl carbonate (DEC), vinylene carbonate (VC), dimethyl carbonate (DMC), dipropyl carbonate (DPC), dimethylsulfoxide, acetonitrile, dimethoxyethane, diethoxyethane, tetrahydrofuran, N-methyl-2-pyrrolidone (NMP), ethylmethyl carbonate (EMC), and gamma butyrolactone (γ-butyrolactone). However, the salt and the rising solvent of the liquid electrolyte 160 are not necessarily limited to the above-listed components, and similar effects may be obtained even when known components and equivalents thereof are applied.

In addition, the liquid electrolyte may further include other additives in order to further improve effects of high-temperature output characteristics, high-temperature stability, overcharge prevention, and battery expansion suppression at a high temperature. Such other additives may include: at least one of cyclic carbonate compounds such as vinylene carbonate (VC) or vinyl ethylene carbonate (VEC); halogen-substituted carbonate-based compounds such as fluoroethylene carbonate (FEC); sultone compounds such as 1,3-propane sultone (PS), 1,4-butane sultone, ethensultone, 1,3-propene sultone (PRS), 1,4-butene sultone, or 1-methyl-1,3-propene sultone; sulfate-based compounds such as ethylene sulfate (Esa), trimethylene sulfate (TMS), or methyltrimethylene sulfate (MTMS); phosphate-based or phosphite-based compounds such as lithium difluoro(bisoxalato)phosphate, lithium difluorophosphate, lithium tetrafluoro oxalato phosphate, or tris(trimethylsilyl)phosphate; borate-based compounds such as tetraphenylborate, lithium oxalyldifluoroborate (LiODFB), or lithium bisoxalatoborate (LiB(C$_2$O$_4$)$_2$, LiBOB), benzene-based compounds such as fluorobenzene; silane-based compounds such as tetravinyl-silane, or lithium salt compounds such as LiPO$_2$F$_2$, LiSO$_3$F, or LiBF$_4$. The other additives may be contained in a content of about 0.01% to 30% by weight, particularly 0.01% to 15% by weight, based on the total weight of the liquid electrolyte.

In addition, the thermosetting compound A, which is one of the curable compounds, may be a compound capable of gelating the curable electrolyte composition 155 by forming cross-links through a thermal polymerization reaction and may not be particularly limited as long as the compound is a thermosetting compound used in the manufacture of conventional gel electrolytes. In particular, the thermoset-ting compound A may be at least one of polymerizable monomers, oligomers, or copolymers, which have a polym-erizable functional group selected from the group consisting of a vinyl group, an epoxy group, an allyl group, and a (meth)acrylic group capable of causing a polymerization reaction in the structure and are phase changed into a gel phase by polymerization or crosslinking.

More particularly, representative examples of the polym-erizable monomer may include at least one of tetraethylene glycol diacrylate, poly ethylene glycol diacrylate (molecular weight 50 to 20,000), 1,4-butanediol diacrylate, 1,6-hexane-diol diacrylate, trimethylolpropane triacrylate, trimethylol-propane ethoxylate triacrylate, trimethylolpropane propoxy-late triacrylate, ditrimethylolpropane tetraacrylate, pentaerythritol tetraacrylate, pentaerythritol ethoxylate tet-raacrylate, dipentaerythritol pentaacrylate, dipentaerythritol hexaacrylate, poly(ethylene glycol) diglycidylether, 1,5-hexadiene diepoxide, glycerol propoxylate triglycidyl ether, vinylcyclohexene dioxide, 1,2,7,8-diepoxyoctane, 4-vinyl-cyclohexene dioxide, butyl glycidyl ether, diglycidyl 1,2-cyclohexanedicarboxylate, ethylene glycol diglycidyl ether, glycerol triglycidyl ether, or glycidyl methacrylate.

In addition, representative examples of the copolymers may include at least one of polyvinylidene-co-hexafluoro-propylene (PVDF-HFP), allyl 1,1,2,2-tetrafluoroethyl ether (TFE)-(2,2,2-trifluoroethyl acrylate) copolymers, TFE-vinyl acetate copolymers, TFE-(2-vinyl-1,3-dioxolane) copoly-mers, TFE-vinyl methacrylate copolymers, TFE-acryloni-trile copolymers, TFE-vinyl acrylate copolymers, TFE-methyl acrylate copolymers, TFE-methyl methacrylate (MMA) copolymers, or TFE-2,2,2-trifluoroethyl acrylate (FA) copolymers.

When using the thermosetting compound (A) as the curable compound, a polymerization initiator may be further contained to induce the thermal curing.

The polymerization initiator may be decomposed by heat having a temperature 30° C. to 100° C. or decomposed at room temperature (5° C. to 30° C.) to form radicals in the battery, but is not limited thereto, and may form a gel electrolyte by reacting with polymerizable monomers by free radical polymerization.

Representative examples of the polymerization initiator may include organic peroxides or hydroperoxides such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and azo compounds such as 2,2'-azobis(2-cyanobutane), 2,2'-azobis(methylbuty-ronitrile)), 2,2'-azobis (iso-butyronitrile) (AIBN) or 2,2'-azobisdimethylvaleronitrile (AMVN).

The polymerization initiator may be contained in a con-tent of 0.01 parts to 20 parts by weight, particularly 0.1 parts to 10 parts by weight, based on 100 parts by weight of the thermosetting compound A. When the polymerization ini-tiator is within a range of 0.01 parts to 20 parts by weight, a conversion rate of the curable compound may increase to secure properties of the gel electrolyte, and pre-reaction may be prevented to improve a wetting property (wetting prop-erty) of the electrolyte solution for the electrode.

In addition, the UV curable compound B, which is one of the curable compounds, may include an UV curable acrylate monomer. The acrylate monomer may include at least one selected from the group consisting of octyl/decyl acrylate (ODA), isodecyl acrylate (IDA), lauryl acrylate (LA), stearyl acrylate (SA), phenoxyethyl acrylate (PEA), nonyl phenol ethoxylate monoacrylate (MNPEOA), tetrahydrofur-furyl acrylate, cyclohexyl acrylate, 4-butylcyclohexyl acry-late, dicyclopentenyl acrylate, dicyclopentenyl oxyethyl acrylate, 4-hydroxybutyl acrylate (4-HBA), and phenoxy-ethyl acrylate.

When using the UV curable compound B as the curable compound, a photopolymerization initiator may be further contained to induce photocuring of the curable compound.

Examples of the photopolymerization initiator may include at least one of ethylbenzoin ether, isopropylbenzoin ether, α-methylbenzoin ethyl ether, benzoin phenyl ether, α-acyloxime ester, 1,1-dichloroacetophenone, 2-hydroxy-2-methyl-1-phenylpropan-1-one, 1-hydroxycyclohexylphenyl ketone, anthraquinone, 2-anthraquinone, 2-chloroanthraqui-none, thioxanthone, isopropyl thioxanthone, chlorothioxan-thone, benzophenone, benzyl benzoate, or benzoyl benzoate.

The curable electrolyte composition 155 may contain a curable compound at a content of 3 wt % to 30 wt % based on the total weight of the composition. When the content of the curable compound is less than 3 wt % based on the total weight of the curable electrolyte composition 155, it is difficult to form a gel-phase electrolyte composition even when the curable compound is cured. In addition, when the content of the curable compound exceeds 30 wt % based on the total weight of the gel electrolyte 150, since viscosity of the curable electrolyte composition 155 increase, in the injecting the curable electrolyte composition 155 into the battery cell 100, flowability of the curable electrolyte com-position 155 may be poor, and thus, it may not be easy to move the curable electrolyte composition 155 into the accommodation space 110p1 in which the electrode tab 121 is formed, and a portion of the curable electrolyte compo-sition 155 may remain between the electrodes 122 during movement. Since the curable electrolyte composition 155 remaining between the electrodes 122 has a higher ionic conductivity than the liquid electrolyte 160, it may cause a negative effect on performance of the battery cell 100 (e.g., an increase in battery internal resistance, etc.). In an embodi-ment, the content of the curable compound in the curable electrolyte composition 155 may be 5 wt % to 30 wt % based on the total weight of the curable electrolyte composition. In an embodiment, the content of the curable compound in the curable electrolyte composition 155 may be 5 wt % to 25 wt % based on the total weight of the curable electrolyte composition. Particularly, the content of the curable com-pound may be 8 wt % to 20 wt % based on the total weight of the curable electrolyte composition. More particularly, the content of the curable compound may be 13 wt % to 30 wt % based on the total weight of the curable electrolyte composition.

Referring again to FIG. 8, in the manufacturing method according to an embodiment of the present disclosure, an injection space 110$p$2 may be formed in the pouch 114. Here, the injection space 110$p$2 may be a space defined at one side (upper side) of the accommodation space 110$p$1, in which the electrodes 122 are accommodated, in the internal space formed between the first cell sheet 114T and the second cell sheet 114P. For example, a region from the opened second outer circumferential portion 114$b$ to the accommodation space 110$p$1 of the pouch 114 may be set as the injection space 110$p$2. The injection space 110$p$2 may be configured to communicate with the accommodation space 110$p$1. The injection space 110$p$2 may serve as a passage through which the curable electrolyte composition 155 or the liquid electrolyte 160 moves to the accommodation space 110$p$1.

Figure 9:
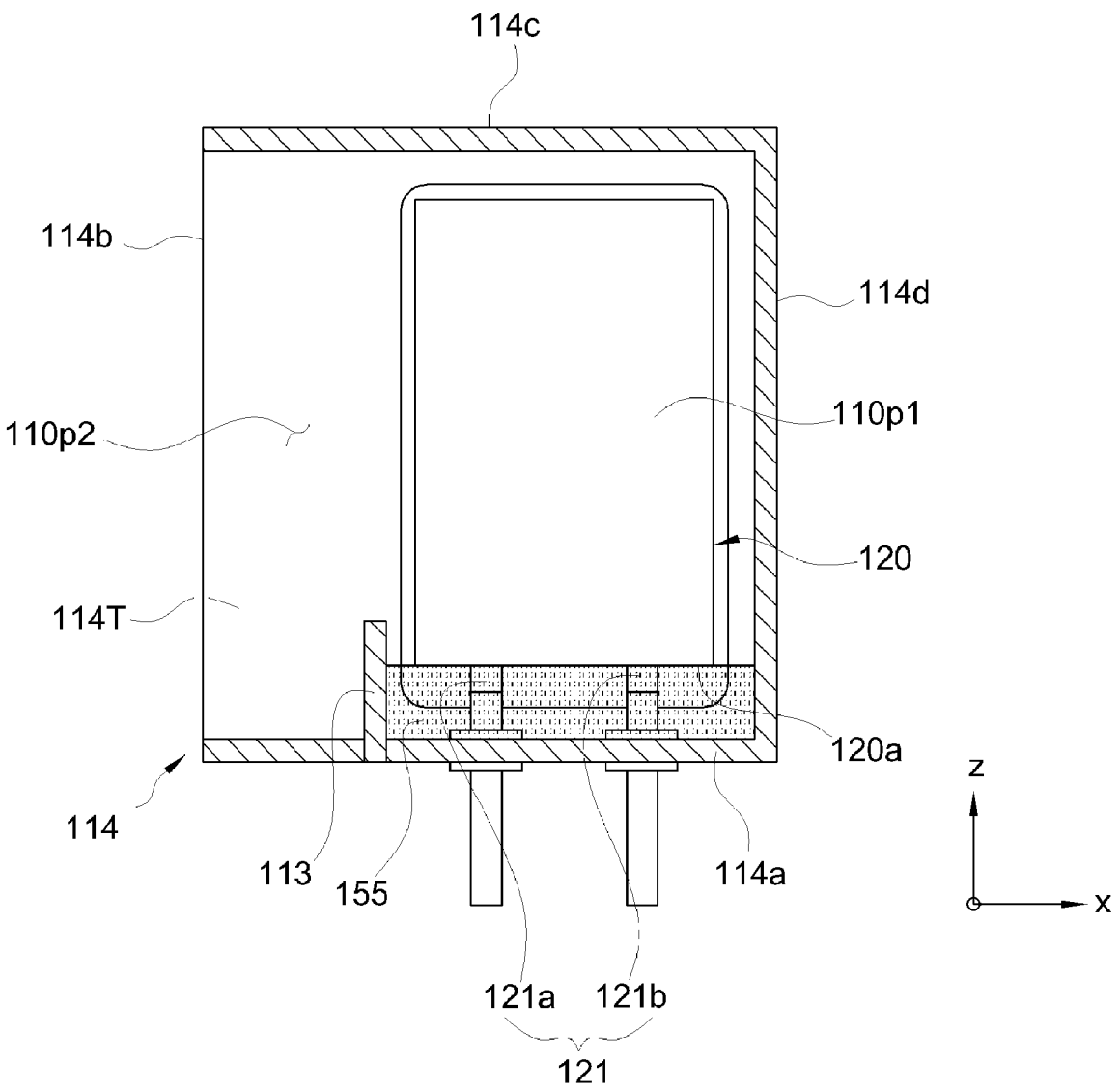
FIG. 9 is a front view illustrating an internal configuration of the pouch, in which the curable electrolyte composition disposed around an electrode tab in the accommodation space is thermally cured, in the method for manufacturing the battery cell according to another embodiment of the present disclosure.

FIG. 9 is a front view illustrating an internal configuration of the pouch 114, in which the curable electrolyte composition 155 disposed around an electrode tab in the accommodation space 110$p$1 is thermally cured, in the method for manufacturing the battery cell according to another embodiment of the present disclosure. For reference, in FIG. 9, for description of the drawings, the pouch 114 is illustrated transparently so that the inside of the pouch 114 is seen from the outside.

Referring to FIG. 9, after the injecting the curable electrolyte composition 155 as in FIG. 8, the pouch 114 rotates such that the electrode tab 121 faces downward. That is, the curable electrolyte composition 155 may be disposed by gravity such that the curable electrolyte composition 155 surrounds the electrode tab 121.

In an embodiment, the curing of the curable electrolyte composition 155 may include curing the curable electrolyte composition 155, which is disposed in the accommodation space 110$p$1 to surround the electrode tab 121, into a gel phase. For example, as illustrated in FIG. 9, when the curable electrolyte composition 155 includes the thermosetting compound, the curable electrolyte composition 155 may be thermally cured by storing the curable electrolyte composition 155 in a constant temperature bath set at a predetermined temperature for a predetermined period of time or longer. The temperature of the thermosetting compound is raised to form the cross-links through the thermal polymerization reaction to convert the curable electrolyte composition 155 that is in the liquid state into the curable electrolyte composition 155 that is in the gel state. For example, when storing the pouch 114 inside the constant temperature bath, the pouch 114 may be stored in the constant temperature bath at a temperature of 60 degrees for 5 hours to 24 hours to convert the curable electrolyte composition 155 into the gel state.

Figure 10:
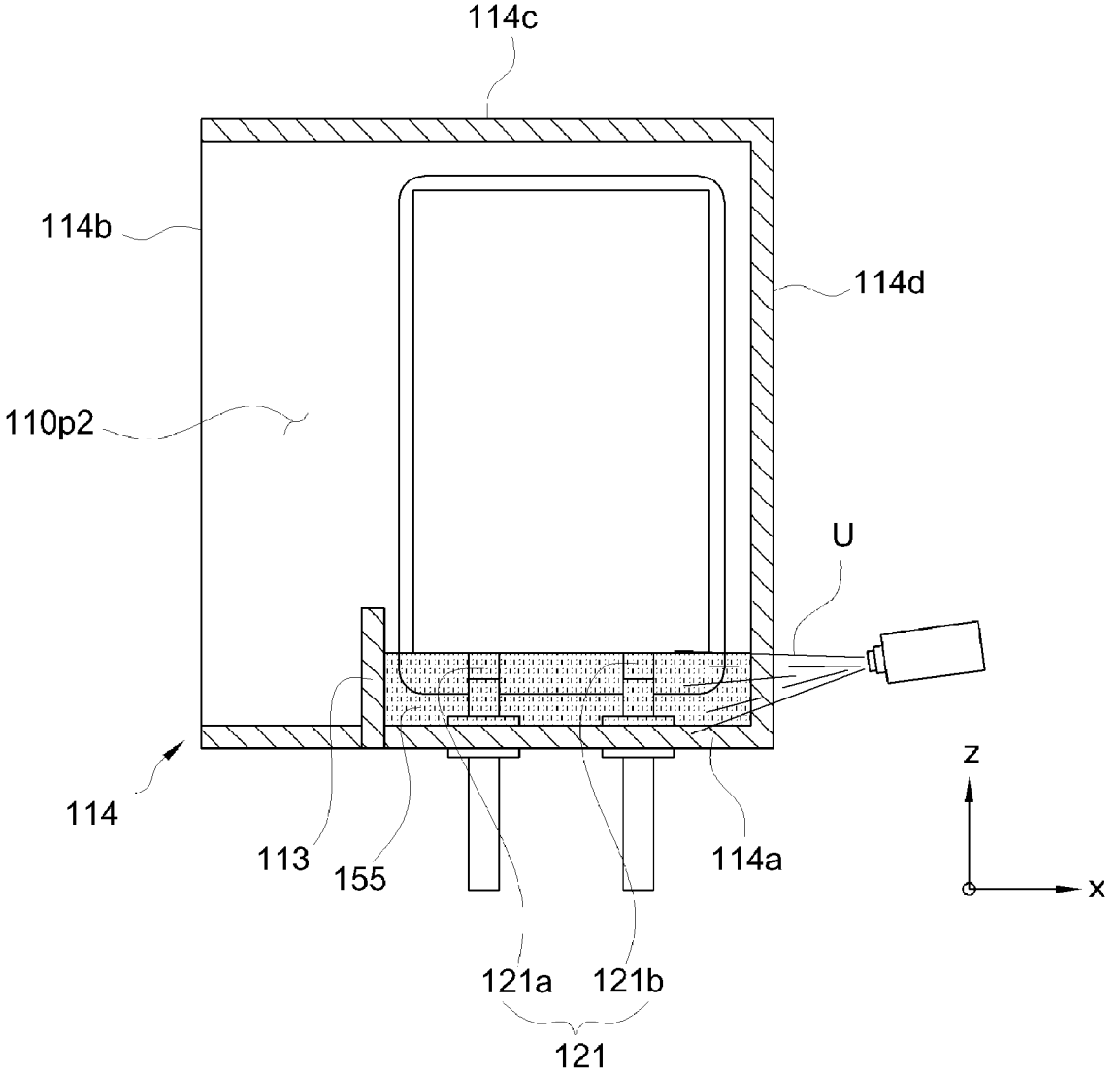
FIG. 10 is a front view illustrating an internal configuration of the pouch, in which the curable electrolyte composition disposed around the electrode tab in the accommodation space is UV-cured, in the method for manufacturing the battery cell according to another embodiment of the present disclosure.

FIG. 10 is a front view illustrating an internal configuration of the pouch 114, in which the curable electrolyte composition 155 disposed around the electrode tab in the accommodation space is UV-cured, in the method for manufacturing the battery cell 100 according to another embodiment of the present disclosure. For reference, in FIG. 10, for description of the drawings, the pouch 114 is illustrated transparently so that the inside of the pouch 114 is seen from the outside.

Referring to FIG. 10, in the method for manufacturing the battery cell 100 according to another embodiment of the present disclosure, the curable electrolyte composition 155 may include an ultraviolet curable compound (not shown). In this case, the curable electrolyte composition 155 injected into the accommodation space 110$p$1 may be cured by ultraviolet rays. Here, an ultraviolet curing device (not shown) may be used for irradiating ultraviolet rays U so that the ultraviolet curable compound is cured by the ultraviolet rays U.

In the case of using the ultraviolet curable compound, compared to the case of using the thermosetting compound, a separate storage place such as the constant temperature bath for the thermal curing is unnecessary to simplify the electrode manufacturing process, and also, during the curing process, since a degree of temperature increase of the electrode assembly 120 is small, the negative effect on the performance of the battery cell 100 may be reduced.

In the manufacturing method according to another embodiment, the curable electrolyte composition may include a curable compound capable of being crosslinked when exposed to radiation. For example, the curable compound may include polyacrylic acid. The curable electrolyte composition may be gelled by being exposed to the radiation. For example, the curable electrolyte composition may be crosslinked with polyacrylic acid by irradiating gamma rays generated from an electron beam (E-BEAM) and may be phase changed into the gel electrolyte after being crosslinked to a predetermined degree of crosslinking.

Therefore, according to this configuration of the present disclosure, the curable electrolyte composition uses the radiation crosslinking (curing) method, which is environmentally friendly as it does not require a harmful catalyst, unlike other general polymerization initiators, and simultaneously, chemically reacts in a solid state or at a low temperature. In addition, since the curing treatment is possible in a short time, energy consumption is also small.

Referring again to FIGS. 7 to 9, in the manufacturing method according to an embodiment of the present disclosure, forming a blocking part 113 may be performed before or after, preferably before the injecting the curable electrolyte composition 155. The blocking part 113 may be configured to block the movement of the curable electrolyte composition 155 from the accommodation space 110$p$1 to the injection space 110$p$2. As illustrated in FIG. 9, when the pouch 114 rotates at an angle of 90 degrees in a counterclockwise direction, that is, when the pouch 114 rotates to be disposed so that the electrode tab 121 faces downward, the curable electrolyte composition 155 moves to be disposed at the first side 120$a$ of the electrode assembly 120 in the accommodation space 110$p$1. The blocking part 113 may prevent the curable electrolyte composition 155 from moving from the accommodation space 110$p$1 to the injection space 110$p$2. More specifically, the blocking part 113 may be formed between the injection space 110$p$2 and the accommodation space 110$p$1. The blocking part 113 may be formed to block a space between the injection space 110$p$2 and the accommodation space 110$p$1 of the pouch 114. For example, as illustrated in FIG. 8, the blocking part 113 may have an elongated shape to extend from the first outer circumferential portion 114$a$ of the pouch 114 facing the electrode tab 121 to the third outer circumferential portion 114$c$.

Thus, according to this configuration of the present disclosure, the manufacturing method of the present disclosure further includes forming the blocking part 113 before or after the injecting the curable electrolyte composition 155 to prevent the curable electrolyte composition 155 from moving the accommodation space 110$p$1 to the injection space 110$p$2 before curing the curable electrolyte composition 155 injected into the accommodation space 110$p$1. Thus, in the manufacturing method of the present disclosure, the curable electrolyte composition 155 may be prevented from being separated into the injection space 110$p$2 in the curing process, and it is easy to maintain the state in which the curable electrolyte composition 155 is disposed to surround the electrode tab 121 until the curable electrolyte composition 155 is cured by the blocking portion 113, thereby significantly improving manufacturing processability.

In addition, in the forming of the blocking part 113, the blocking part 113 may be formed to extend along a boundary between the accommodation space 110p1 and the injection space 110p2 from the outer circumferential portion of the pouch 114. For example, as illustrated in FIG. 8, the blocking part 113 extending from the first outer circumferential portion 114a along the boundary between the accommodation space 110p1 and the injection space 110p2 may be formed in the pouch 114. The blocking part 113 may be formed to protrude more toward the third outer circumferential portion 114c of the electrode assembly 120 than an end of the first side 120a of the electrode assembly 120.

Figure 11:
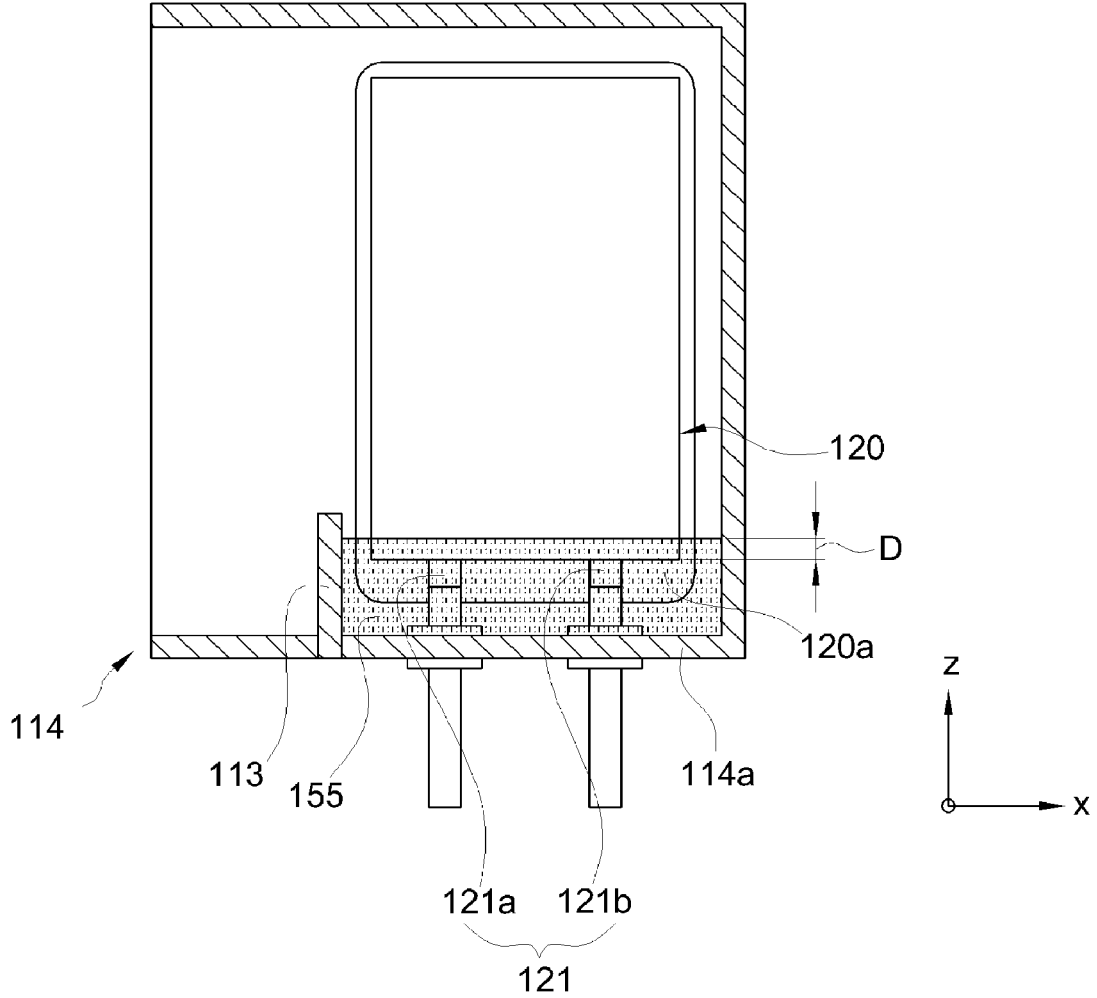
FIG. 11 is a front view illustrating an internal configuration of the pouch, in which a gel electrolyte is disposed around the electrode tab in the accommodation space, in the method for manufacturing the battery cell according to another embodiment of the present disclosure.

FIG. 11 is a front view illustrating an internal configuration of the pouch 114, in which the cured gel electrolyte 150 is accommodated in the accommodation space, in the method for manufacturing the battery cell 100 according to further another embodiment of the present disclosure. For reference, in FIG. 11, for description of the drawings, the pouch 114 is illustrated transparently so that the inside of the pouch 114 is seen from the outside.

Referring to FIG. 11 together with FIG. 2, in the method of manufacturing the battery cell 100 according to an embodiment, a portion of the electrode assembly 120 may be immersed in the gel electrolyte 150 in which the curable electrolyte composition 155 is cured. For example, as illustrated in FIG. 11, an immersion depth D of the one side of the electrode assembly 120 at which the electrode tab 121 immersed in the gel electrolyte is disposed may be 10 mm or less. When the immersion depth D of the electrode assembly 120 immersed into the gel electrolyte 150 exceeds 10 mm, the gel electrolyte 150 may have ion conduction resistance greater than that of the liquid electrolyte 160 to act as a factor that impairs the performance of the electrode 122 or the electrode assembly 120.

Therefore, according to this configuration of the present disclosure, in the manufacturing method of the present disclosure, the forming of the blocking part 113 includes forming the blocking part 113 to protrude further to the inside of the electrode assembly 120 than one end of the electrode assembly 120, on which the electrode tab 121 is disposed. The curable electrolyte composition 155 may be in contact with the first side 120a of the electrode assembly 120 or may be filled into the accommodation space 110p1 to the extent of immersing a portion of the first side 120a as illustrated in FIG. 11. Thus, in the present disclosure, the curable electrolyte composition 155 accommodated in the pouch 114 in which the blocking part 113 is formed may be cured to form the gel electrolyte 150, and thus, one end of the electrode assembly 120 on which the electrode tab 121 is disposed may be supported and fixed by the gel electrolyte 150 so as not to move toward the first outer circumferential portion 114a of the pouch 114. Ultimately, the battery cell 100 manufactured by the manufacturing method of the present disclosure may effectively reduce damage to the electrode assembly 120 accommodated in the accommodation space 110p1 due to an external impact.

Referring again to FIGS. 2, 7, and 8, the forming of the blocking part 113 may include melting and bonding a portion between the injection space 110p2 and the accommodation space 110p1 of the pouch 114. That is, the blocking part 113 may be formed to block a portion of the space by bonding a portion of a region between the injection space 110p2 and the accommodation space 110p1 of the pouch 114. For example, in the forming of the blocking part 113, inner surfaces of the first cell sheet 114T and the second cell sheet 114P of the pouch 114 may be thermally fused in a state of being in close contact with each other by a hot press.

According to this configuration of the present disclosure, the manufacturing method of the present disclosure includes melting and bonding a portion between the injection space 110p2 and the accommodation space 110p1 of the pouch 114 to form the blocking part 113 by using a sealing device, which has been used for forming the sealing part 111 of the existing pouch 114, without a separate blocking member for blocking the injection space 110p, thereby minimizing costs for forming the blocking part 113.

Figure 12:
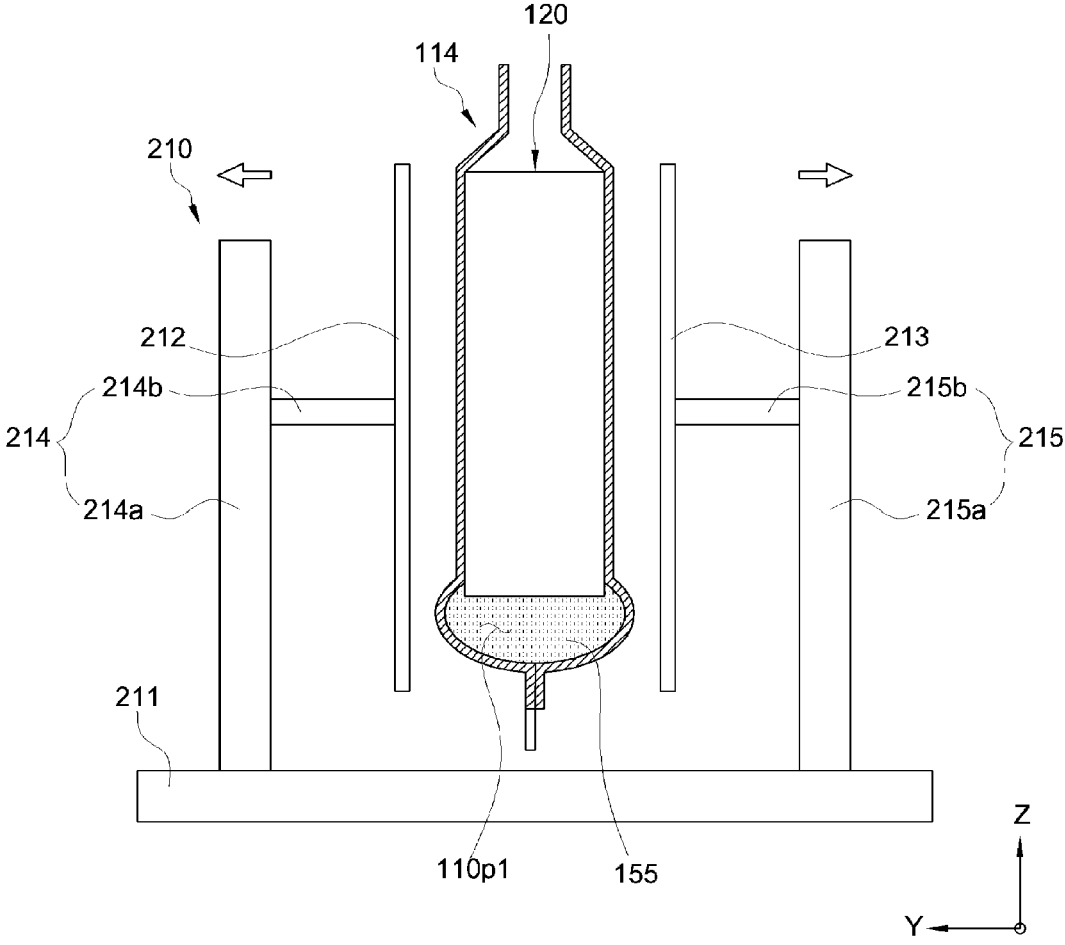
FIGS. 12 and 13 are side views illustrating a state before and after a battery cell is fixed using a fixing jig while a curable electrode composition is cured in the method for manufacturing the battery cell according to another embodiment of the present disclosure.
Figure 13:
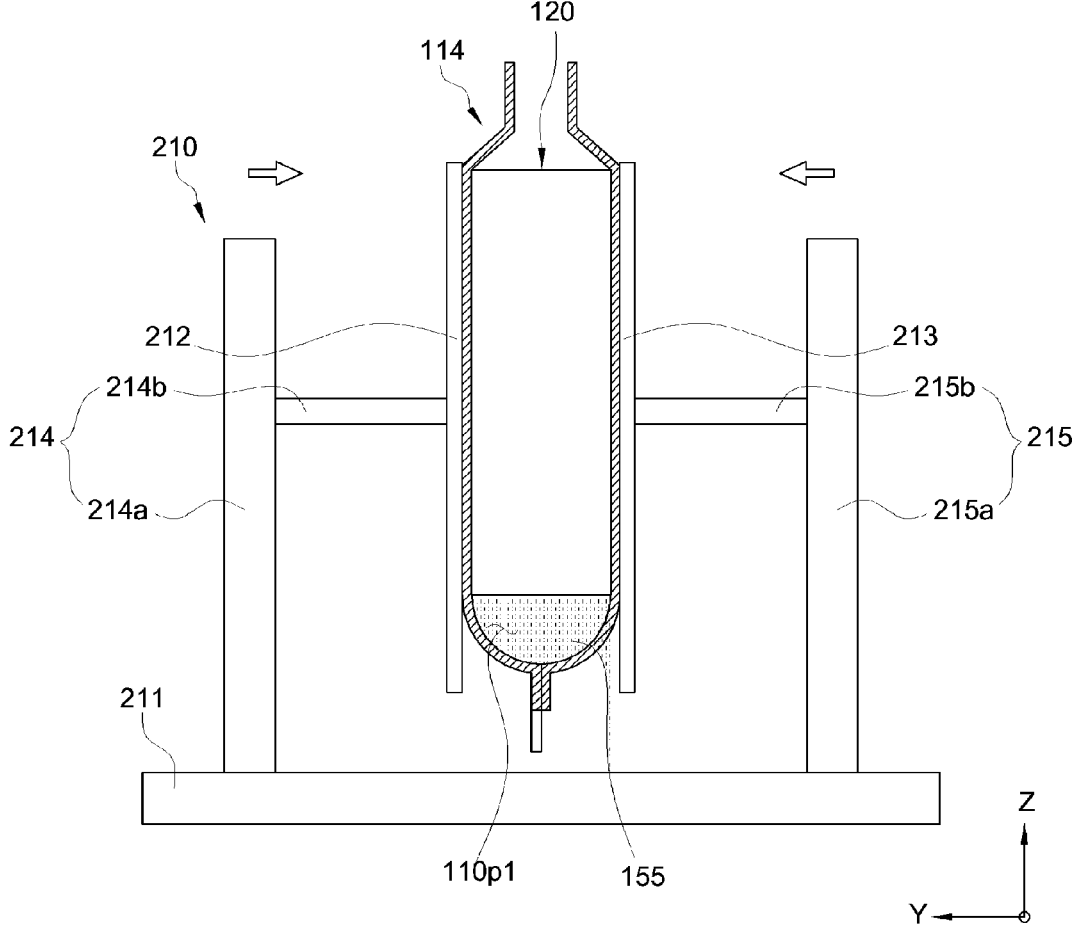

FIGS. 12 and 13 is a side view illustrating a state before a battery cell is fixed using a fixing jig 210 while a curable electrode composition 155 is cured in the method for manufacturing the battery cell according to another embodiment of the present disclosure. Also, FIG. 13 is a side view illustrating a state after the battery cell 100 is fixed using the fixing jig 210 while the curable electrode composition 155 is cured in the method for manufacturing the battery cell 100 according to another embodiment of the present disclosure. For convenience of description, the electrode tab and the like are not illustrated in FIGS. 12 and 13.

Referring again to FIGS. 12 and 13 together with FIGS. 4 and 9, when the curable electrolyte composition 155 is injected into the pouch 114, a portion of the accommodation space 110p1 of the pouch 114 in which the curable electrolyte composition 155 is accommodated may be convexly deformed in an outward direction due to the fluidity of the curable electrolyte composition 155. When the curable electrolyte composition 155 is cured in the form, in which a portion of the accommodation space 110p1 of the pouch 114 is convexly deformed, since each product has a different deformation form, it may be difficult to ensure consistent quality of the product, and defects may occur because an outer appearance of the pouch 114 is not smooth. Thus, the curing process of the manufacturing method of the present disclosure may include pressing and fixing the pouch 114 while the curable electrolyte composition 155 is cured. Here, both outer sides of the pouch 114 may be pressed and fixed using a fixing jig 210. Particularly, the fixing jig 210 may include a first jig plate 212 and a second jig plate 213. Each of the first jig plate 212 and the second jig plate 213 may have a size corresponding to or larger than that of one surface of the pouch 114. That is, each of the first jig plate 212 and the second jig plate 213 may have a size capable of covering the pouch 114. The pouch 114 and the electrode assembly 120 accommodated inside the pouch 114 may be interposed between the first jig plate 212 and the second jig plate 213. In addition, a portion of the convexly deformed accommodation space 110p1 of the pouch 114 may be pressed by the first jig plate 212 and the second jig plate 213.

In addition, the fixing jig 210 may further include a pedestal 211, a first support 214, and a second support 215. The first support 214 and the second support 215 may be disposed on both sides (Y-axis direction) by using the pouch 114 as a center. The pedestal 211 may be configured to be mounted on the ground so that the fixing jig 210 is stably disposed on the ground. The pedestal 211 may have a plate shape extending parallel to the ground. For example, as illustrated in FIG. 12, the first support 214 may include a pillar part 214a extending from a top surface of the pedestal 211 in an upward direction (Z-axis direction), and a connection part 214b extending in a horizontal direction from the pillar part 214a and connected to a side portion of the first jig plate 212 in a positive direction of the Y axis. In addition, the second support 215 may include a pillar part 215a extending from the top surface of the pedestal 211 in the upward direction, and a connection part 215b extending in the horizontal direction from the pillar part 215a and connected to a side portion of the first jig plate 213 in a negative direction of the Y axis.

Furthermore, the first support 214 and the second support 215 may be configured to be movable on the pedestal 211 in a direction closer to each other or configured to be movable in a direction away from each other. For example, when the first support 214 and the second support 215 move in the direction closer to each other, the first jig plate 212 and the second jig plate 213, which are connected to the first support 214 and the second support 215, respectively, may move closer to each other. Here, both outer sides of the pouch 114 disposed between the first jig plate 212 and the second jig plate 213 may be pressed to fix the pouch 114 and the electrode assembly 120 accommodated in the pouch 114. For example, when the curing of the curable electrolyte composition 155 is completed, the fixed state of the pouch 114 may be released by moving the first support 214 and the second support 215 in the direction away from each other. For example, as illustrated in FIG. 12, the pouch 114 may have a shape in which a portion of the accommodation space 110p1 of the pouch 114 protrudes convexly due to the curable electrolyte composition 155. However, as illustrated in FIG. 13, when the first support 214 and the second support 215 move toward the pouch 114, the pouch 114 may be pressed by the first jig plate 212 and the second jig plate 213, and the accommodation space 110p1 that is convex by the curable electrolyte composition 155 may be guided to be deformed into an embedded shape by the pressing.

Therefore, according to this configuration of the present disclosure, the curing process may include pressing and fixing the pouch 114 while the curable electrolyte composition 155 is cured, and thus, the electrode assembly 120 accommodated inside the pouch 114 may be stably fixed, and the curable electrolyte composition 155 may be prevented from being gelated in the state in which a portion of the accommodation space 110p1 of the pouch 114 is convexly deformed to the outside due to the curable electrolyte composition 155. Thus, the present disclosure may effectively reduce a defective rate of the battery cell 100.

Figure 14:
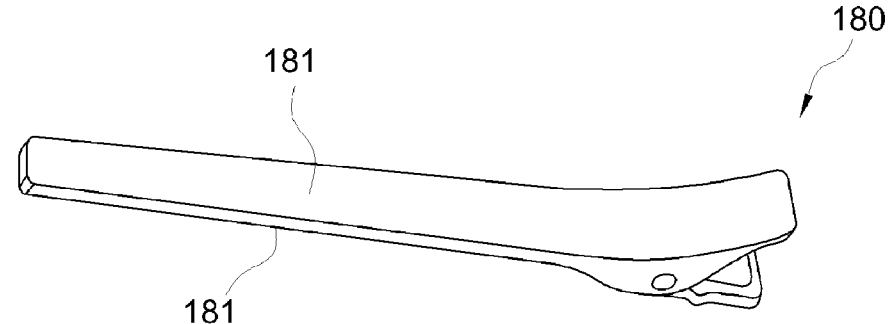
FIG. 14 is a perspective view illustrating a configuration of a blocking member that presses a portion between an accommodation space and an injection space of a pouch in a method for manufacturing a battery cell according to further another embodiment of the present disclosure.
Figure 15:
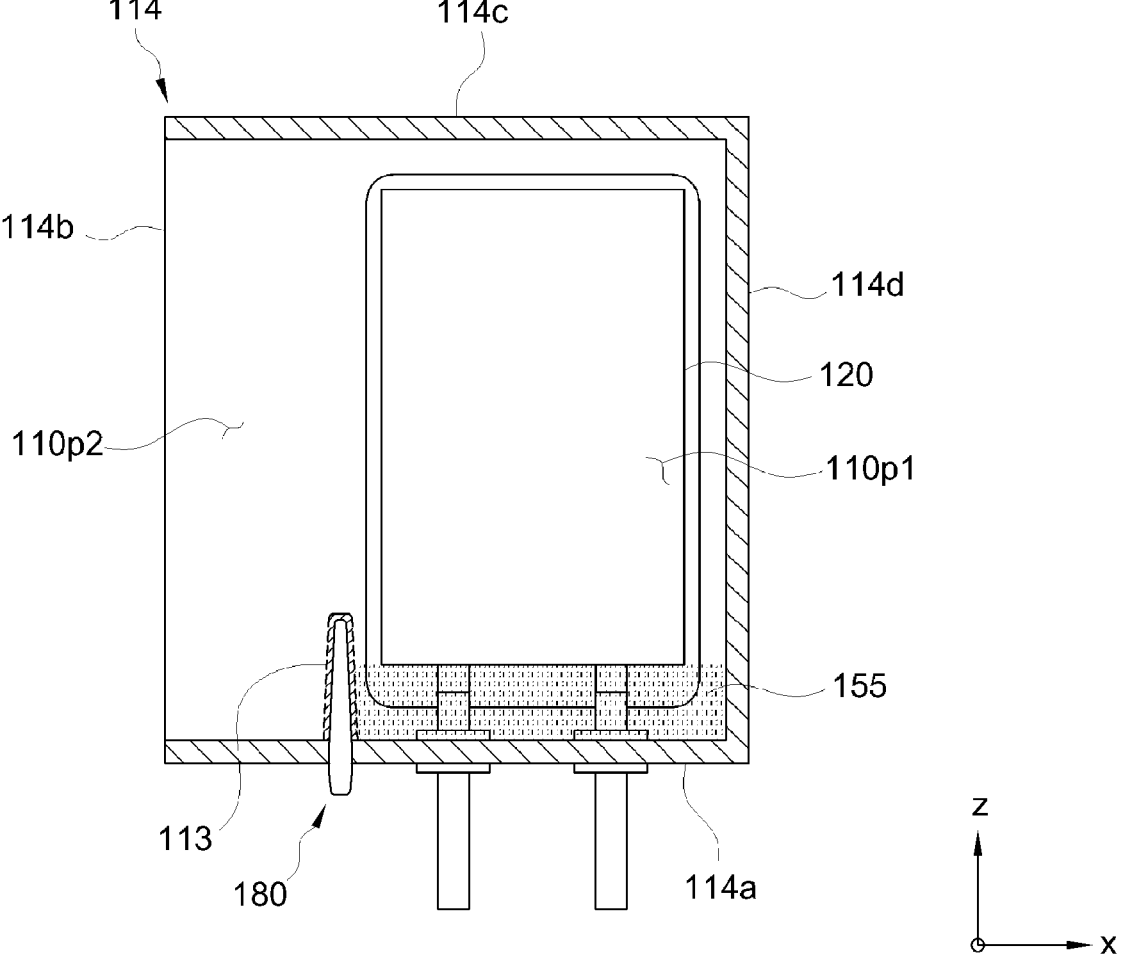
FIG. 15 is a perspective view illustrating a state, in which a portion between the accommodation space and the injection space of the pouch is pressed using the blocking member, in the method for manufacturing the battery cell according to further another embodiment of the present disclosure.

FIG. 14 is a perspective view illustrating a configuration of a blocking member 180 that presses a portion between an accommodation space 110p1 and an injection space 110p2 of a pouch 114 in a method for manufacturing a battery cell 100 according to further another embodiment of the present disclosure. FIG. 15 is a perspective view illustrating a state, in which a portion between the accommodation space 110p1 and the injection space 110p2 of the pouch 114 is pressed using the blocking member 180, in the method for manufacturing the battery cell 100 according to further another embodiment of the present disclosure. For reference, in FIGS. 14 and 15, for convenience of explanation of the drawings, the inside of the pouch 114 is illustrated transparently to be seen from the outside.

Referring again to FIGS. 14 and 15 together with FIG. 4, the forming of the blocking part 113 in the method for manufacturing the battery cell 100 according to another embodiment of the present disclosure may include pressing and blocking a portion between the accommodation space 110p1 and the injection space 110p2 of the pouch 114. Here, in the manufacturing method of the present disclosure, a portion between the accommodation space 110p1 and the injection space 110p2 may be pressed by using a separate blocking member. The blocking member may temporarily form a blocking part 113 in the pouch 114 so that the curable electrolyte composition 155 does not move from the accommodation space 110p1 to the injection space 110p2. For example, as illustrated in FIG. 15, a portion of the pouch 114 between the accommodation space 110p1 and the injection space 110p2 may be pressed using a tong member as the blocking member 180 to temporarily form the blocking part 113.

As the blocking member 180 for forming the blocking part 113, the tong member in the form of a pin illustrated in FIG. 14 may be used. For example, as illustrated in FIG. 15, after interposing a portion between the accommodation space 110p1 and the injection space 110p2 of the pouch 114 between two fingers 181 of the tongs, the two fingers 181 may make narrower to press the portion between the accommodation space 110p1 and the injection space 110p2, thereby forming the blocking part 113.

Therefore, according to this configuration of the present disclosure, in the manufacturing method of the present disclosure, the forming of the blocking part 113 may include pressing and blocking a portion between the accommodation space 110p1 and the injection space 110p2 to simply form the blocking part 113 without thermally fusing a portion of the pouch 114, thereby effectively improving manufacturing efficiency.

Referring again to FIGS. 8 and 9 together with FIG. 2, the manufacturing method according to another embodiment of the present disclosure may further include rotating the pouch so that the electrode tab 121 is disposed below the electrodes 122, which is performed after the injecting the curable electrolyte composition 155. Here, the pouch 114 may be disposed so that relatively wide surfaces of the cell sheets 114T and 114P are placed in a front and rear direction (Y-axis direction). That is, the pouch 114 may be disposed to stand vertically with respect to the ground. For example, as illustrated in FIG. 9, the pouch 114 may rotate at an angle of 90 degrees in a clockwise or counterclockwise direction with respect to that the pouch 114 is viewed from the front surface (viewed in the Y-axis direction) of the pouch 114 after the injecting the curable electrolyte composition 155 so that the electrode tab 121 is disposed in a lower portion the electrode assembly 120. That is, the pouch 114 may rotate so that the electrode tab 121 is disposed toward the direction of gravity after the injecting the curable electrolyte composition 155. Here, the injected curable electrolyte composition 155 may be disposed in a lower portion of the accommodation space 110p1, in which the electrode tab 121 is disposed, by gravity.

As illustrated in FIG. 8, in the injecting the curable electrolyte composition 155, the injected curable electrolyte composition 155 may be dispersed in the accommodation space 110p1 of the pouch 114, and then, in the rotating of the pouch 114, the pouch 114 may rotate so that the electrode tab 121 is disposed at the lower portion. As a result, the curable electrolyte composition 155 may be gathered at the lower portion to surround the electrode tab 121 in the accommodation space 110p1.

Therefore, according to this configuration of the present disclosure, the manufacturing method of the present disclosure may further include disposing the pouch 114 so that the electrode tab 121 is disposed in the lower portion the electrode assembly 120, which is performed the injecting the curable electrolyte composition 155. Thus, the curable electrolyte composition 155 may be well gathered in the lower portion of the accommodation space 110p1 of the pouch 114 to surround the electrode tab 121, and thus, the gel electrolyte 150 may be prevented from being disposed at a position other than the intended position, thereby effectively reducing the manufacturing defect rate of the battery cell 100. That is, since an amount of curable electrolyte composition 155 gathered at the first side 120*a* of the electrode assembly 120 is reduced, the effect of improving durability of the electrode tab 121 may be deteriorated.

Furthermore, when a portion of the gel electrolyte 150 remains between the electrodes 122, the gel electrolyte 150 may have ion conduction resistance greater than that of the liquid electrolyte 160, and thus, the performance of the battery cell may be relatively low compared to the battery cell using only the liquid electrolyte 160. However, in the manufacturing method of the present disclosure, the remaining of the gel electrolyte 150 in the electrode assembly 120 may be minimized to prevent an occurrence of defects due to poor durability or performance of the manufactured battery cell.

Figure 16:
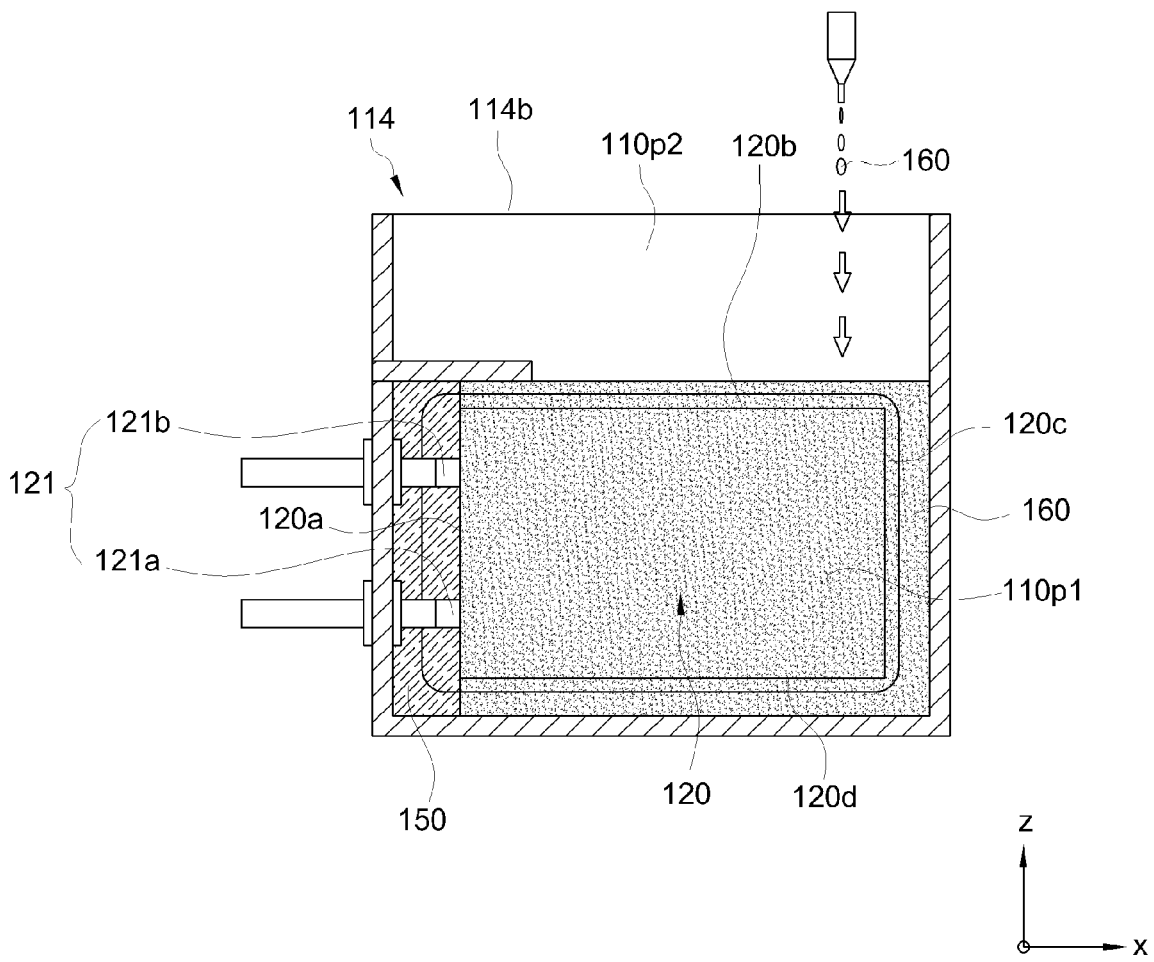
FIG. 16 is a perspective view illustrating an internal configuration of a pouch, in which a liquid electrolyte is injected into an accommodation space, in a method for manufacturing a battery cell according to another embodiment of the present disclosure.

FIG. 16 is a perspective view illustrating an internal configuration of a pouch 114, in which a liquid electrolyte 160 is injected into an accommodation space 110*p*1, in a method for manufacturing a battery cell according to another embodiment of the present disclosure.

A composition of the liquid electrolyte may be the same as or different from that of the liquid electrolyte used in preparing the curable electrolyte composition.

Referring again to FIGS. 2, 4, 9, and 16, the method of manufacturing the battery cell according to an embodiment of the present disclosure may further include positing the electrode tab 121 in an X-axis direction of the electrode assembly 120 before the injecting the liquid electrolyte 160. Here, the pouch 114 may be erected in a vertical direction (Z-axis direction) with respect to the ground so that the accommodation space 110*p*1 is seen from the front side. Here, since the curable electrolyte composition 155 has already undergone the phase change to form the gel electrolyte 150, even when the pouch 114 rotates so that the electrode tab 121 is disposed at the side portion (X-axis direction) of the electrode assembly 120, the gel electrolyte 150 may not move to another position in the accommodation space 110*p*1. Also, the liquid electrolyte 160 may be filled into a remaining space of the accommodation space 110*p*1, in which the gel electrolyte 150 is not disposed.

In detail, the injecting the liquid electrolyte 160 may include injecting the liquid electrolyte 160 into the accommodation space 110*p*1 via the injection space 110*p*2 through the opened outer circumferential portions 114*b* of the first and second cell sheets 114T and 114P. Here, the liquid electrolyte 160 may be disposed between the electrodes 122 and disposed to surround other sides, at which the electrode tab 121 is not disposed, of the electrodes 122. For example, the liquid electrolyte 160 may be disposed between the electrodes 122 and disposed at the outermost side of the electrodes 122. Also, as illustrated in FIG. 16, the liquid electrolyte 160 may be disposed to surround a second side 120*b*, a third side 120*c*, and a fourth side 120*d* of the electrode assembly 120.

Therefore, according to this configuration of the present disclosure, when the liquid electrolyte 160 disposed between the electrodes 122 is consumed during the charging and discharging of the manufactured battery cell 100, the liquid electrolyte 160 disposed at the other side may move between the electrodes 122 by an amount of liquid electrolyte 160 consumed to supplement the liquid electrolyte 160. As a result, after a plurality of charging and discharging cycles of the battery cell 100, even if the liquid electrolyte 160 is reduced, the battery cell 100 capable of minimizing a decrease in lifespan may be manufactured.

Figure 17:
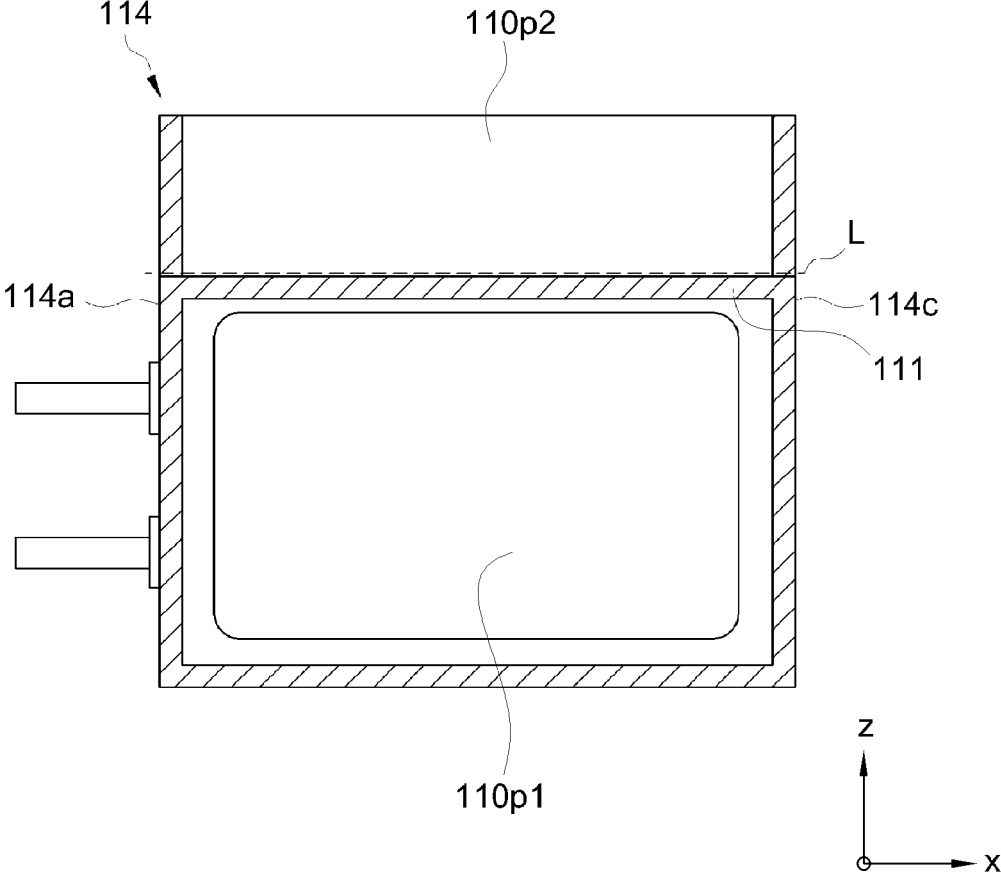
FIG. 17 is a front view illustrating a state, in which one side of the accommodation space is additionally sealed, in the method for manufacturing the battery cell according to another embodiment of the present disclosure.
Figure 18:
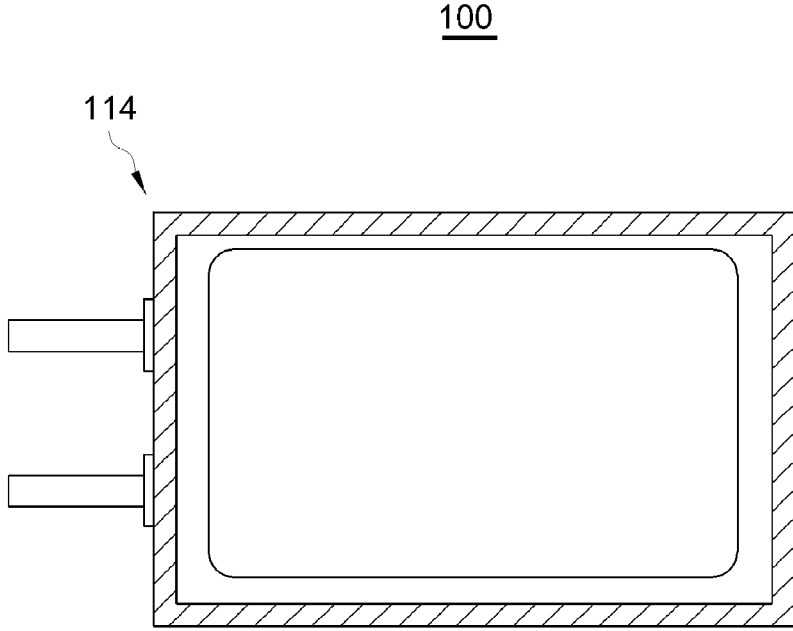
FIG. 18 is a front view illustrating a state in which an injection space of the pouch is removed in the method for manufacturing the battery cell according to another embodiment of the present disclosure.

FIG. 17 is a front view illustrating a state, in which one side of the accommodation space 110*p*1 of the pouch 114 is additionally sealed, in the method for manufacturing the battery cell 100 according to another embodiment of the present disclosure. Also, FIG. 18 is a front view illustrating a state in which an injection space 110*p*2 of the pouch 114 is removed in the method for manufacturing the battery cell 100 according to another embodiment of the present disclosure.

Referring again to FIGS. 17 and 18 together with FIG. 4, the method of manufacturing the battery cell 100 according to another embodiment of the present disclosure further includes sealing the accommodation space 110*p*1 of the pouch 114 and cutting a region of the injection space 110*p*2. Particularly, in the sealing of the accommodation space 110*p*1 of the pouch 114, an entire boundary between the accommodation space 110*p*1 and the injection space 110*p*2 of the pouch 114 may be thermally fused. For example, as illustrated in FIG. 17, a first outer circumferential portion 114*a* to a third outer circumferential portion 114*c* of the pouch 114 along the boundary between the accommodation space 110*p*1 and the injection space 110*p*2 of the pouch 114 may be thermally fused to form a sealing part 111. For example, as in the manufacturing method of the battery cell 100 of FIG. 8 described above, when a portion between the injection space 110*p*2 and the accommodation space 110*p*1 of the pouch 114 is thermally fused to form the blocking part 113, in order to additionally form the sealing part 111, the thermal fusion may be performed from the blocking part 113 to the third outer circumferential portion 114*c* of the pouch 114.

In addition, a cutting line L may be set outside the sealing part 111. Then, as illustrated in FIG. 18, a region of the injection space 110*p*2 of the pouch 114 may be removed by cutting along the cutting line L.

Furthermore, in the manufacturing method according to another embodiment of the present disclosure, a battery activation process may be performed before the sealing of the accommodation space 110*p*1 of the pouch 114, which is performed in FIG. 17. Here, the battery activation process is a process of performing a charge/discharge operation first in the battery cell 100. During the charging/discharging operation of the battery cell 100, a large amount of gas is generated. The generated gas may move from the accommodation space 110*p*1 to the injection space 110*p*2 and be discharged to the outside through the opened second outer circumferential portion 114*b* of the pouch 114. In this battery activation process, magnitude of the charging current and a charging/discharging time may vary depending on materials of the positive electrode 122*p* and the negative electrode 122*n*.

In addition, in the manufacturing method according to another embodiment of the present disclosure, a battery aging process may be performed after the sealing of the accommodation space 110*p*1 of the pouch 114. Here, a temperature may be, for example, 45 degrees to 70 degrees, and the aging time may be 1 day to 3 days.

Thus, according to this configuration of the present disclosure, in the method for manufacturing the battery cell 100 of the present disclosure, after injecting the curable electrolyte composition 155 to be disposed in the form surrounding the electrode tab 121, the curable electrolyte composition 155 may be cured to form a gel electrolyte 150. Thus, compared to the case in which the liquid electrolyte 160 of the battery cell 100 according to the related art surrounds the electrode tab 121, when an external impact is applied to the manufactured battery cell 100, the deformation of the electrode tab 121 may be prevented by the gel electrolyte 150 surrounding the electrode tab 121. Thus, even if frequent impacts and vibrations generated during traveling, such as in a vehicle, are transmitted to the battery cell 100, the movement of the electrode tab 121 may be minimized by the gel electrolyte 150. Thus, the present disclosure may prevent electric charging and discharging of the electrode 122 from being deactivated due to disconnection of the electrode tab 121 due to the frequent movement of the electrode tab 121.

That is, the battery cell 100 manufactured by the manufacturing method of the present disclosure may form the gel electrolyte 150 in the accommodation space 110p1 to surround the electrode tab 121, thereby reducing damage of the electrode tab 121 even with the frequent external impacts and thus manufacturing the battery cell 100 that having an increasing lifespan. In addition, the manufacturing method of the present disclosure may manufacture the battery cell 100 that is capable of preventing a battery capacity from decreasing during the use by preventing the disconnection of the electrode tab 121 of the battery cell 100.

In addition, the liquid electrolyte 160 having the fluidity may be maximally secured in the space between the accommodation space 110p1 and the electrode assembly 120 to manufacture the battery cell 100 that is capable of minimizing the decrease in lifespan even though the amount of liquid electrolyte 160 between the electrodes 122 after the plurality of charging and discharging cycles.

Figure 19:
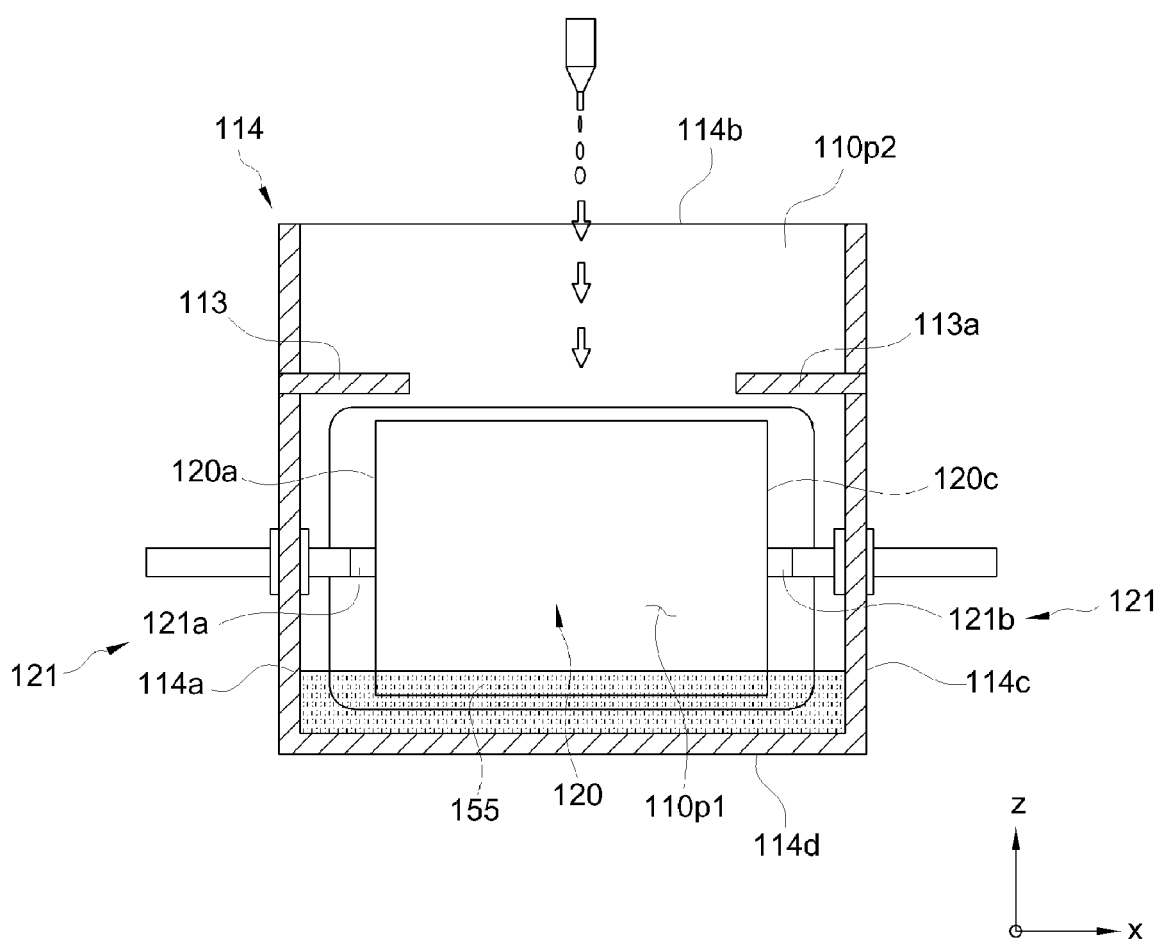
FIG. 19 is a front view illustrating a process of primarily injecting a curable electrolyte composition in a method for manufacturing a battery cell according to further another embodiment of the present disclosure.
Figure 20:
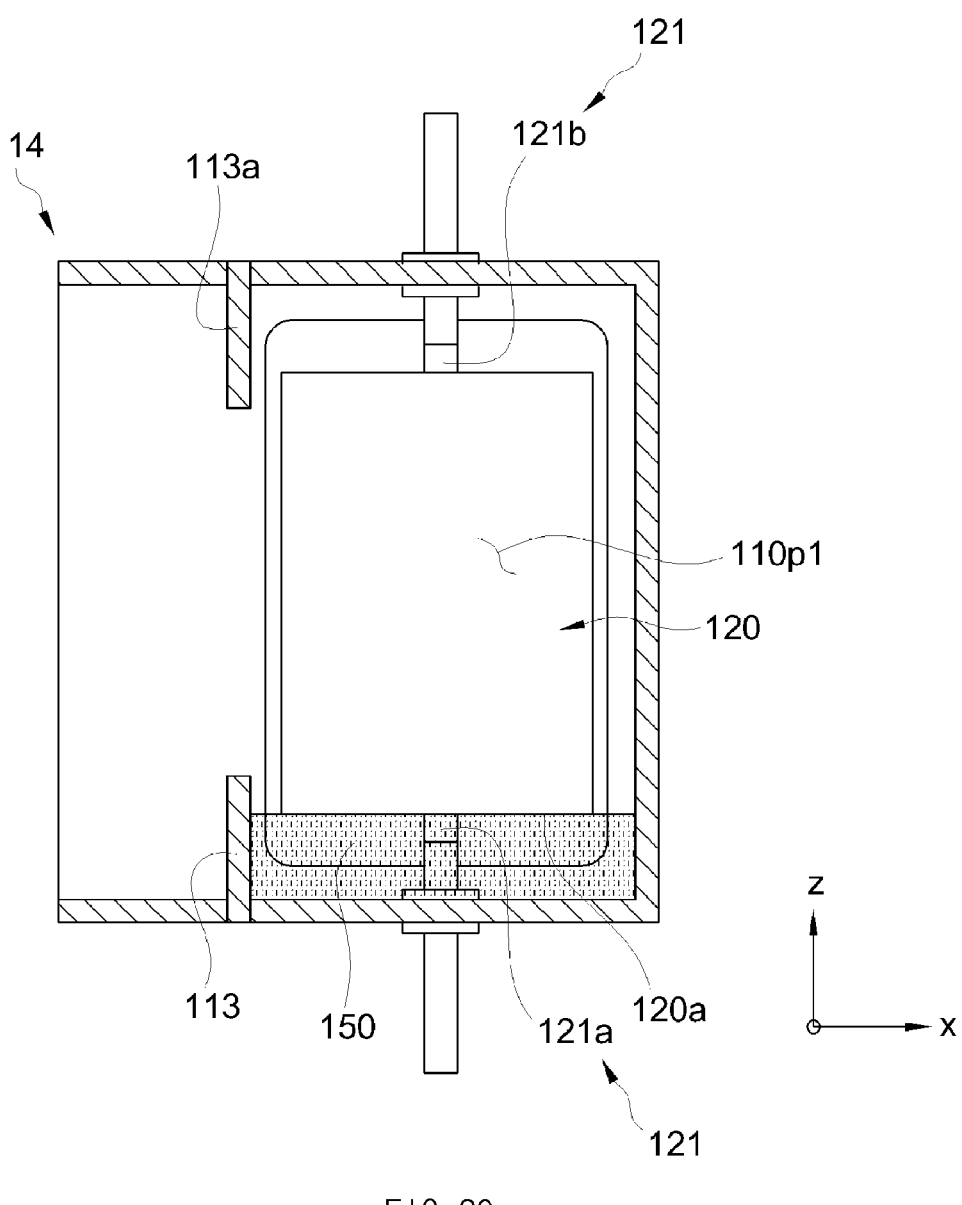
FIG. 20 is a front view illustrating a process of primarily curing the curable electrolyte composition in the method for manufacturing the battery cell according to further another embodiment of the present disclosure.
Figure 21:
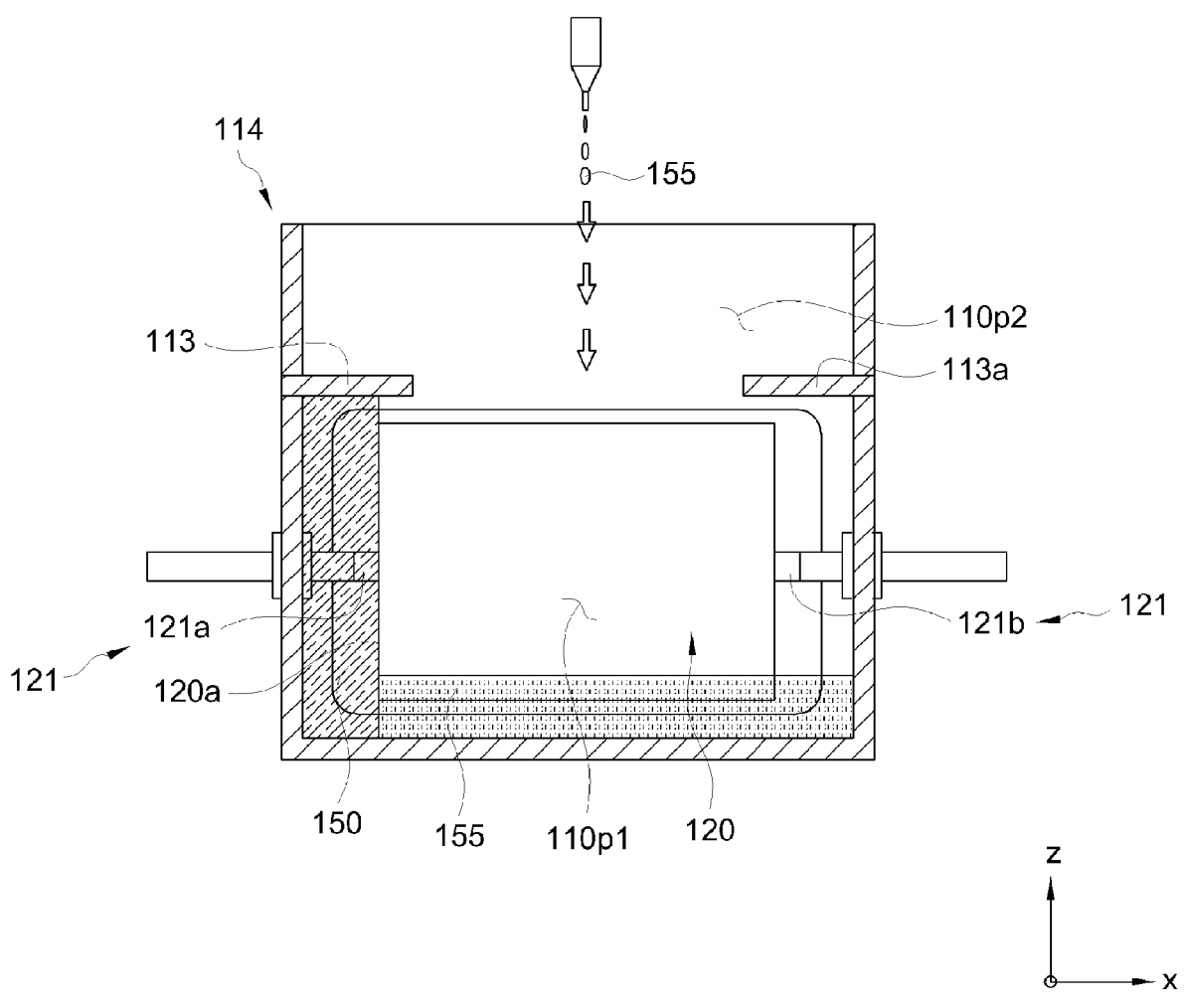
FIG. 21 is a front view illustrating a process of secondarily injecting the curable electrolyte composition in the method for manufacturing the battery cell according to further another embodiment of the present disclosure.
Figure 22:
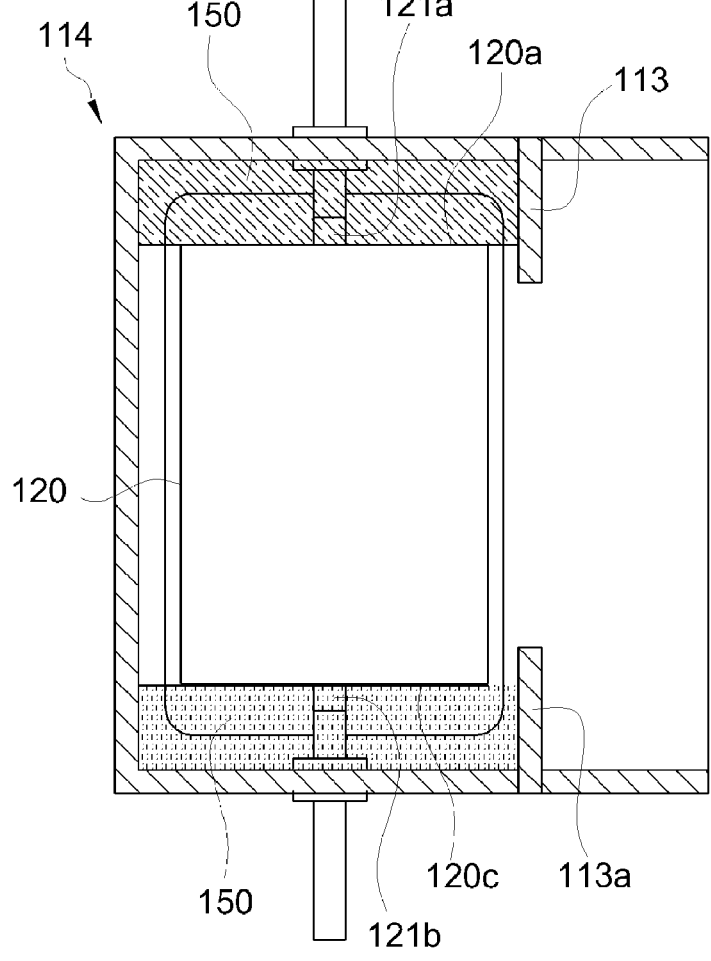
FIG. 22 is a front view illustrating a process of secondarily curing the curable electrolyte composition in the method for manufacturing a battery cell according to further another embodiment of the present disclosure.
Figure 22:
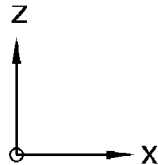

FIGS. 19 to 22 illustrate a method for manufacturing the battery cell according to further another embodiment of the present disclosure. Particularly, FIG. 19 is a front view illustrating a process of primarily injecting the curable electrolyte composition in the method for manufacturing the battery cell, in which electrode tabs protrude in opposite to each other. FIG. 20 is a front view illustrating a process of primarily curing the curable electrolyte composition in the method for manufacturing the battery cell according to further another embodiment of the present disclosure. FIG. 21 is a front view illustrating a process of secondarily injecting the curable electrolyte composition 155 in the method for manufacturing the battery cell according to further another embodiment of the present disclosure. FIG. 22 is a front view illustrating a process of secondarily curing the curable electrolyte composition 155 in the method for manufacturing a battery cell according to further another embodiment of the present disclosure. For reference, in FIGS. 19 to 22, for convenience of explanation of the drawings, the inside of the pouch 114 is shown transparently so as to be visible from the outside.

Referring to FIGS. 19 to 22, in the manufacturing method according to another embodiment of the present disclosure, unlike the battery cell 100 of FIG. 3 in which the electrode tab 121 is formed only at one side of the electrode plate, the electrode tabs 121 of the manufactured battery cell may be formed to face each other on at least two or more sides of each of the electrode plates (not shown). For example, as illustrated in FIG. 19, in the method of manufacturing the battery cell according to another embodiment of the present disclosure, one positive electrode tab 121a and one negative electrode tab 121b are formed at opposite sides of each of the electrodes 122. Thus, as illustrated in FIG. 19, the positive electrode tab 121a and the negative electrode tab 121b may be disposed on both sides 120a and 121c of the electrode assembly 120, respectively. In addition, compared to the pouch 114 of FIG. 9, an additional blocking part 113a may be further formed in the pouch 114 of FIG. 19.

In addition, in the manufacturing method according to another embodiment of the present disclosure, the injecting the curable electrolyte composition 155 and the curing of the curable electrolyte composition 155 may be repeatedly performed for each space of the side portion of the electrode assembly 120, at which the electrode tab 121 is disposed, in the accommodation space 100p1. For example, as illustrated in FIG. 19, when the electrode tabs 121 are formed at both sides of the electrodes 122, in the injecting the curable electrolyte composition 155, primarily injecting the curable electrolyte composition 155 into a space of one side 120a of the electrode assembly 120, at which the electrode tab 121 is disposed, in the accommodation space 110p1 may be performed. In the curing process, the curable electrolyte composition 155 filled in the accommodation space 110p1 of the one side 120a of the electrode assembly 120 of the pouch 114 may be primarily cured. After the primary curing process, a secondarily injecting process of secondarily injecting the curable electrolyte composition 155 into the accommodation space 110p1 of the other side 120c of the electrode assembly 120, at which the electrode tab 121 is disposed, in the accommodation space 110p1 and a secondary curing process of curing the curable electrolyte composition 155 filled into the accommodation space 110p1 of the other side 120c of the electrode assembly 120 may be sequentially performed.

For example, as illustrated in FIG. 19, in the battery cell manufactured by the manufacturing method according to another embodiment of the present disclosure, the electrode tabs 121a and 121b may be disposed at both sides 120a and 120c of the electrode assembly 120, respectively. In this case, in the manufacturing method of the present disclosure, in the injecting the curable electrolyte composition 155, the curable electrolyte composition 155 may be primarily injected into a space facing the first side 120a of the electrode assembly 120, at which the electrode tab 121a, in the accommodation space 110p1 of the pouch 114. After the primary injection of the curable electrolyte composition 155, as illustrated in FIG. 20, the pouch 114 may rotate so that the electrode tab 121a disposed at the first side 120a of the electrode assembly 120 is disposed in a lower portion of the electrode assembly 120. Here, the curable electrolyte composition 155 may be blocked from moving from the accommodation space 110p1 to the injection space 110p2 by the blocking part 113. Then, the curable electrolyte composition 155 filled in the space facing the first side 120a of the electrode assembly 120 may be cured until the curable electrolyte composition 155 becomes a gel state (primary curing process). Then, as illustrated in FIG. 20, after the primary curing process, the pouch 114 may rotate so that the electrode tab 121 disposed at the first side 120a is disposed at one side of the X-axis direction with respect to the electrode assembly 120. Then, the curable electrolyte composition 155 may be secondarily injected into the space facing the third side 120c of the electrode assembly 120, at which the positive electrode tab 121b is disposed, in the accommodation space 110p1 of the pouch 114. Furthermore, as illustrated in FIG. 22, the pouch 114 may rotate so that the electrode tab 121 disposed at the third side 120c is disposed in the lower portion of the electrode assembly 120. Here, the curable electrolyte composition 155 may be blocked from moving from the accommodation space 110p1 to the injection space 110p2 by an additional blocking part 113a. In addition, a temperature of the curable electrolyte composition 155 filled in the space disposed at the third side 120c of the electrodes 122 increases to cure the secondary injected curable electrolyte composition 155 until the secondary injected curable electrolyte composition 155 becomes a gel state. The secondarily injected curable electrolyte composition 155 may be transformed into a gel electrolyte 150.

In the manufacturing method according to another embodiment of the present disclosure, after the secondarily injected curable electrolyte composition 155 is secondarily cured until the secondarily injected curable electrolyte composition 155 becomes the gel state to form the gel electrolyte 150, injecting the liquid electrolyte 160, removing the injection space 110p2 of the pouch 114, and sealing the pouch 114 may be further performed.

Except for the above-described processes described in FIGS. 19 to 22, the remaining manufacturing processes may be performed similarly to the processes of the manufacturing method according to another embodiment of the present disclosure described in FIGS. 7 to 18. Therefore, the remaining processes for manufacturing the battery cell of the manufacturing method according to another embodiment of the present disclosure will be omitted.

Figure 23:
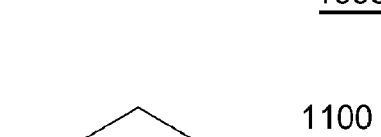
FIG. 23 is a perspective view illustrating a battery module according to an embodiment of the present disclosure.
Figure 23:
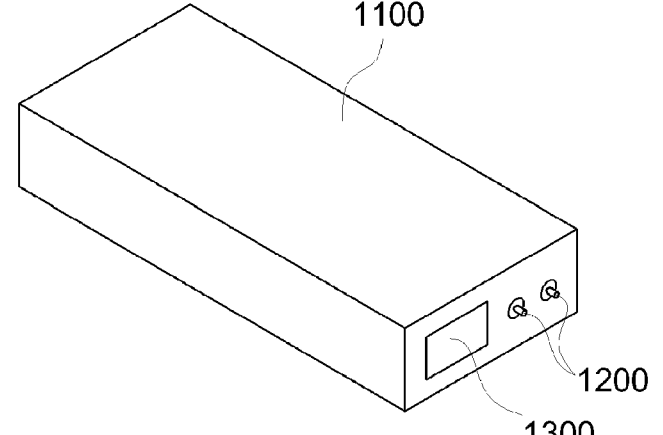
Figure 23:
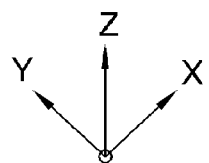

FIG. 23 is a perspective view illustrating a battery module 1000 according to an embodiment of the present disclosure.

Referring to FIG. 23 together with FIG. 1, the present disclosure may provide the battery module 1000 including at least one battery cell 100. The battery module 1000 may include a module housing 1100 accommodating a battery cell (not shown in FIG. 23) therein, external output terminals 1200 provided at a front end of the module housing 1100, and a controller 1300 controlling charging and discharging of the battery cell 100. In addition, when two or more battery cells 100 are provided, the battery module 1000 may further include a bus bar (not shown) electrically connecting the two or more battery cells 100 to each other. The bus bar may be electrically connected to the electrode lead 130 of each of the battery cells 100. In the battery module 1000 of the present disclosure, essential components other than the battery cell 100 may be applied as well-known configurations, and thus descriptions of these configurations will be omitted.

EXAMPLES

Example 1

Preparation of Liquid Electrolyte Composition

After dissolving $LiPF_6$ in a non-aqueous organic solvent in which ethylene carbonate (EC):ethylmethyl carbonate (EMC) are mixed at a volume ratio of 30:70 so that the $LiPF_6$ is contained in a concentration of 1.0 M, vinylene carbonate (VC) was added at a content of 1 wt % based on the total weight of the solvent to prepare a liquid electrolyte.

Preparation of Curable Electrolyte Composition

After dissolving $LiPF_6$ in a non-aqueous organic solvent mixed in which ethylene carbonate (EC):ethylmethyl carbonate (EMC) are mixed at a volume ratio of 30:70 so that the $LiPF_6$ is contained in a concentration of 1.0 M, 14 wt of trimethylolpropane triacrylate as a curing compound, 0.06 wt % of 2,2'-azobis (iso-butyronitrile) (AIBN) as a polymerization initiator, and 1 wt % of vinylene carbonate (VC) as other additives were added to prepare a curable electrolyte composition E1.

Preparation of Electrode Assembly

A positive electrode active material ($Li(Ni_{0.8}Co_{0.1}Mn_{0.1})O_2$), a conductive material (carbon black), and a binder (polyvinylidene fluoride: PVDF) were added at a weight ratio of 94:3:3 into N-methyl-2-pyrrolidone (NMP) that is a solvent to prepare positive electrode active material slurry (solid content: 48% by weight). The positive electrode active material slurry was applied to a positive electrode collector (Al thin film) having a thickness of 15 μm and dried, and then, roll pressing was performed to prepare a positive electrode. The negative electrode active material (carbon powder), the binder (PVDF), and the conductive material (carbon black) were added at a weight ratio of 96:3:1 into the N-methyl-2-pyrrolidone (NMP) that is a solvent to prepare a negative electrode active material slurry (solid content: 70% by weight). The negative electrode active material slurry was applied to a negative electrode collector (Cu thin film) having a thickness of 10 μm and dried, and then, the roll pressing was performed to prepare a negative electrode. The positive electrode, a separator formed as three layers of polypropylene/polyethylene/polypropylene (PP/PE/PP), and the negative electrode were sequentially stacked to prepare an electrode assembly.

Preparation of Secondary Battery

The prepared electrode assembly was accommodated in a pouch, and the above-prepared curable electrolyte composition E1 was primarily injected into a portion of an accommodation space to surround the electrode tab and then was stored at a high temperature 60° C. for 5 hours in a constant temperature bath to gelate the curable electrolyte composition. Subsequently, the above-prepared liquid electrolyte was secondarily injected so that the electrode assembly is immersed in a remaining space of the pouch, and then the pouch was sealed to prepare a battery cell.

Example 2

Preparation of Curable Electrolyte Composition

After dissolving $LiPF_6$ in a non-aqueous organic solvent mixed in which ethylene carbonate (EC):ethylmethyl carbonate (EMC) are mixed at a volume ratio of 30:70 so that the $LiPF_6$ is in a concentration of 1.0 M, 33 wt of trimethylolpropane triacrylate as a curing compound, 0.06 wt % of 2,2'-azobis (iso-butyronitrile) (AIBN) as a polymerization initiator, and 1 wt % of vinylene carbonate (VC) as other additives were added to prepare a curable electrolyte composition E1.

Preparation of Secondary Battery

A battery cell was prepared in the same manner as in Example 1, except that the above-prepared curable electrolyte composition E2 is injected when a curable electrolyte composition is primarily injected.

Example 3

A curable electrolyte composition E3 was prepared in the same manner as in Example 1, except that polyvinylidene-co-hexafluoropropylene (PVDF-HFP) is used as a curable compound instead of trimethylolpropane triacrylate.

Then, a battery cell was prepared in the same manner as in Example 1, except that the above-prepared curable electrolyte composition E3 is injected when a curable electrolyte composition is primarily injected.

Comparative Example 1. Absence of Curable Compound

Preparation of Liquid Electrolyte Composition

After dissolving $LiPF_6$ in a non-aqueous organic solvent in which ethylene carbonate (EC):ethylmethyl carbonate (EMC) are mixed at a volume ratio of 30:70 so that the $LiPF_6$ is contained in a concentration of 1.0 M, vinylene carbonate (VC) was added at a content of 1 wt % based on the total weight of the solvent to prepare a liquid electrolyte.

Preparation of Secondary Battery

A battery cell was prepared in the same manner as in Example 1, except that the electrode assembly prepared in Example 1 is accommodated in a pouch, and then, only the prepared liquid electrolyte is injected into an entire accommodation space inside the pouch. Particularly, the battery cell in which a liquid electrolyte is accommodated by an amount of curable electrolyte composition in the accommodation space, in which an electrode tab is formed, instead that the storing of the pouch at a high temperature is not performed, in order to cure the curable electrolyte composition without injecting the curable electrolyte composition was prepared.

Comparative Example 2. Containing Gel Electrolyte in Entire Accommodation Space A battery cell was manufactured in the same manner as in Example 1, except that a curable electrolyte composition is injected into an entire accommodation space, in which an electrode tab and an electrode assembly are accommodated, when a secondary battery is manufactured. Particularly, a battery cell was prepared in the same manner as in Example 1, except that a curable electrolyte composition E1 is injected into an entire inner space of a pouch including an electrode tab and an electrode assembly during the primary injection, and a liquid electrolyte is not injected.

EXPERIMENTAL EXAMPLES

Experimental Example 1. Evaluation of Physical Stability and Capacity Retention Rate Three cycles, each of which includes following processes: each of the battery cells prepared in Examples 1 to 3 and the battery cells prepared in Comparative Examples 1 and 2 is charged under constant current-constant voltage (CC-CV) conditions at a temperature of 25° C. until reaching 4.2V at 0.33 C C-rate and is cut-off to 1/20 C, and then, is discharged under a CC condition until reaching 2.5V at 0.33 C C-rate, were performed to measure an initial discharge capacity.

Then, each of the battery cells prepared in Examples 1 to 3 and the battery cells prepared in Comparative Examples 1 and 2 was freely dropped a total of three times from a height of 1 m to a concrete floor. After freely dropping the total of three times, the battery cell was disassembled, and the number of disconnected electrode tabs among the electrode tabs was confirmed and shown in Table 1 below.

In addition, each of the battery cells prepared in Examples 1 to 3 and the battery cells prepared in Comparative Examples 1 and 2, which are subjected to the free drop, is charged under constant current-constant voltage (CC-CV) conditions at a temperature of 25° C. until reaching 4.2V at 0.33 C C-rate and is cut-off to 1/20 C, and then, is discharged under a CC condition until reaching 2.5V at 0.33 C C-rate and freely drops to measure a discharge capacity. The capacity retention rate (%) was calculated using Equation 1 below, and the results are shown in Table 1 below.

$$\text{Capacity retention rate (\%)} = (\text{discharge capacity after free drop/initial discharge capacity}) \times 100 \quad \text{[Equation 1]}$$

TABLE 1

|  | Example 1 | Example 2 | Example 3 | Comparative Example 1 | Comparative Example 2 |
|---|---|---|---|---|---|
| Total number of electrode taps | 7 | 7 | 7 | 7 | 7 |
| Number of disconnected electrode tabs after free drop | 0 | 0 | 0 | 3 | 0 |
| Capacity rate (%) | 99.8 | 99.9 | 99.8 | 56.9 | 99.8 |

Referring to Table 1, it is confirmed that, in the case of the battery cells prepared in Examples 1 to 3 and Comparative Example 2, in which the gel electrolyte is formed around the electrode tab, compared to the battery cell prepared in Comparative Example 1, in which the gal electrolyte is not contained, disconnection of the electrode tab does not occur even after the free drop of the battery cell due to improved physical stability of the tab region.

As a result of cell capacity evaluation conducted after the free drop, it is confirmed that, in the case of the battery cells prepared in Examples 1 to 3 and the battery cells prepared in Comparative Example 2, in which the disconnection of the electrode tab does not occur, most of the existing capacity is expressed, but in the case of the battery cell manufactured in Comparative Example 1 in which the disconnection of the electrode tab occurs, a significant decrease in capacity occurs.

Experimental Example 2. Internal Resistance Evaluation

For electrochemical evaluation (internal resistance), after charging the battery cells prepared in Examples 1 to 3 and the battery cells prepared in Comparative Examples 1 and 2 at 0.33 C C-rate under a CC condition until reaching SOC 50%, a voltage drop occurring when applying current of 2.5 C for 10 seconds was measured to calculate internal resistance by using Equation 2 below. In addition, an internal resistance increase rate (%) of each of the battery cells prepared in Examples 1 to 3 and the battery cells prepared in Comparative Example 2 was calculated based on the internal resistance value of the battery cell prepared in Comparative Example 1 as a reference value (100%), and the results were shown in Table 2 below.

$$R = V/I, \quad \text{[Equation 2]}$$

where R is resistance, V is a voltage (potential difference), and I is current.

Experimental Example 3. High Temperature Cycle Characteristics Evaluation

The battery cells prepared in Examples 1 to 3 and the battery cells prepared in Comparative Example 2 were charged under constant current-constant voltage (CC-CV) conditions until reaching 4.2 V at a rate of 0.33 C at 25° C., and was cut-off to 1/20 C, and then, was discharged under CC condition until reaching 2.5 V at 033 C rate. When the charging and discharging is set as one cycle, 3 cycles of the initial charging and discharging (activation) process were performed.

Subsequently, 100 cycles, each cycle includes following processes: each of lithium secondary batteries initially charged and discharged at a high temperature (45° C.) is charged under the CC-CV conditions until reaching 4.2V at a rate of 0.33 C and is cut-off to 1/20 C, and then, is charged under CC condition until reaching 2.5 V at 0.33 C rate, were performed.

The capacity retention rate was calculated by substituting the capacity after the initial charging and discharging and the capacity after the 100-th cycle into Equation 3 below, and the results were shown in Table 2 below.

$$\text{Capacity retention rate (\%)} = \text{(discharging capacity after 100-th cycle/discharging capacity after initial charge/discharge)} \times 100 \quad \text{[Equation 3]}$$

TABLE 2

|  | Example 1 | Example 2 | Example 3 | Comparative Example 2 |
|---|---|---|---|---|
| Internal resistance increase rate (based on resistance value of Comparative Example 1, %) | 100.4 | 102.3 | 101.1 | 123.7 |
| Capacity retention rate after 100 cycles at 45° C. (%) | 97.3 | 93.3 | 96.8 | 85.0 |

Referring to Table 2 above, it is seen that, in the case of the battery cells prepared in Examples 1 to 3, as the gel electrolyte is present only in the electrode tab portion, the resistance slightly increases compared to the battery cell of Comparative Example 1, in which only the liquid electrolyte is contained, but the internal resistance is significantly reduced compared to the battery cell of Comparative Example 2 in which the gel electrolyte is formed in the entire accommodation space, in which the electrode tab and the electrode assembly are accommodated, except for the electrode tab accommodation region.

In addition, referring to Table 2, it is seen that, in the case of the battery cells prepared in Examples 1 to 3, as the internal resistance decreases, the capacity retention rate (%) characteristics after the high temperature cycle is significantly improved compared to the battery cell of Comparative Example 2.

Referring to these results, when preparing the battery cell containing the curable electrolyte composition in which an appropriate amount of curable compound of the present disclosure is added and disposed in the form surrounding the electrode tab, the deterioration of the battery performance of the battery cell is reduced while securing the effect of improving the durability of the battery cell.

As described above, although the embodiments have been described with limited drawings, those skilled in the art can apply various technical modifications and variations based on the above. For example, even if the described techniques may be performed in an order different from the method described and/or components of the described system, structure, device, circuit, etc. may be coupled or combined in a different form than the method described or substituted or substituted by other components or equivalents, appropriate results can be achieved.

Therefore, other implementations, other embodiments, and equivalents of the claims are within the scope of the following claims.

DESCRIPTION OF REFERENCE NUMERALS

100: Battery cell
1000: Battery module
110: Cell case
110*p*1: Accommodation space

110*p*2: Injection space
113: Blocking part
113*a*: Additional blocking part
114: Pouch
114T: First cell sheet
114P: Second cell sheet
114*a*, 114*b*, 114*c*, 114*d*: First outer circumferential portion, Second outer circumferential portion, Third outer circumferential portion, Fourth outer circumferential portion
120: Electrode assembly
122: Electrode
122*p*: Positive electrode
122*n*: Negative electrode
170: Separator
120*a*, 120*b*, 120*c*, 120*d*: First side, Second side, Third side, Fourth side
121: Electrode tab
121*a*: Positive electrode tab
121*b*: Negative electrode tab
130: Electrode lead
130*a*: Positive electrode lead
130*b*: Negative electrode lead
140: Insulating film
111: Sealing part
150: Gel electrolyte
155: Curable electrolyte composition
160: Liquid electrolyte
210: Fixing jig
211: Pedestal
212: First jig plate
213: Second jig plate
214: First support
214*a*: Pillar part
214*b*: Connection part
215: Second support
215*a*: Pillar part
215*b*: Connection part
180: Blocking member (tong member)
181: Finger of tong member

The invention claimed is:

1. A battery cell comprising:
a cell case having an accommodation space;
an electrode assembly comprising a plurality of electrode plates and separators alternately stacked, and accommodated in the accommodation space;
an electrode tab extending outward from each of the electrode plates configured to electrically connect the each of the electrode plates to an external terminal;
a gel electrolyte disposed in the accommodation space and surrounding the electrode tab formed at one side of the electrode assembly; and
a liquid electrolyte disposed in the accommodation space and surrounding the other side of the electrode assembly, at which the electrode tab is not formed.

2. The battery cell of claim 1, wherein the gel electrolyte is disposed in a space, which is a peripheral region of the electrode tab, in the accommodation space, and
the liquid electrolyte is disposed in the remaining space, in which the gel electrolyte is not disposed, in the accommodation space.

3. The battery cell of claim 1, wherein, in the gel electrolyte, a cured polymer is contained in a content of 3 wt % to 30 wt % based on the total weight of the gel electrolyte.

4. The battery cell of claim 1, wherein the gel electrolyte is disposed in the accommodation space such that one side of the each of the electrode plates, from which the electrode tab extends outward, is immersed in the gel electrolyte, and wherein an immersion depth of the one side of the electrode assembly in the gel electrolyte is 10 mm or less.

5. The battery cell of claim 1, wherein the cell case is a pouch-type cell case.

6. A battery module comprising at least one battery cell of claim 1.

7. A method for manufacturing a battery cell, the method comprising:

preparing an electrode assembly provided with a plurality of electrode plates, which are provided with an electrode tab formed at one side thereof, and separators disposed between the electrode plates;

disposing the electrode assembly in an accommodation space of a pouch;

injecting a curable electrolyte composition through an injection space of the pouch such that the curable electrolyte composition surrounds the electrode tab in the accommodation space of the pouch;

converting the curable electrolyte composition into a gel electrolyte having a gel phase; and injecting a liquid electrolyte into the accommodation space such that the liquid electrolyte surrounds the other side of the electrode assembly, at which the electrode tab is not formed.

8. The method of claim 7, wherein a curable compound is contained in a content of 3 wt % to 30 wt % in the curable electrolyte composition.

9. The method of claim 7, wherein the converting the curable electrolyte composition into the gel electrolyte having the gel phase comprises curing the curable electrolyte composition through heat, ultraviolet rays, or radiation.

10. The method of claim 7, wherein the method further comprises, before the injecting the curable electrolyte composition, forming a blocking part configured to block movement of the curable electrolyte composition from the accommodation space to the injection space.

11. The method of claim 10, wherein the forming of the blocking part comprises forming the blocking part such that the blocking part extends along a boundary between the accommodation space and the injection space from an outer circumferential portion of the pouch and protrude to the inside of the electrode assembly further than one end of the electrode assembly.

12. The method of claim 10, wherein the forming of the blocking part comprises melting and bonding a portion between the injection space and the accommodation space of the pouch or pressing the portion between the accommodation space and the injection space of the pouch.

13. The method of claim 7, wherein the method further comprises, before the converting the curable electrolyte composition into the gel electrolyte having the gel phase, pressing and fixing the pouch and the electrode assembly by using a jig plate outside the pouch to fix a shape of the curable electrolyte composition.

14. The method of claim 7, wherein the converting the curable electrolyte composition into the gel electrolyte having the gel phase-to prevent the electrode tab from moving is performed in a state in which the pouch and the electrode assembly are pressed and fixed.

15. The method of claim 7, wherein the injecting the curable electrolyte composition comprises disposing the pouch and the electrode assembly such that the electrode tab is disposed in a lower portion of the electrode assembly, and disposing the curable electrolyte composition to surround the electrode tab by gravity.

16. The method of claim 7, further comprising, before the injecting the liquid electrolyte, rotating the pouch such that the electrode tab is disposed at a side portion of the electrode assembly.

17. The method of claim 7, wherein the pouch is a configuration before manufacturing a cell case in which the accommodation space is completely sealed.

* * * * *